United States Patent
Hardy

(10) Patent No.: US 12,121,167 B2
(45) Date of Patent: Oct. 22, 2024

(54) ERGONOMIC BOWLS AND OTHER VESSELS FOR WATER AND FOODSTUFF

(71) Applicant: Old Dog New Tricks LLC, Bend, OR (US)

(72) Inventor: Alan Hardy, Bend, OR (US)

(73) Assignee: Old Dog New Tricks LLC, Bend, OR (US)

(*) Notice: Subject to any disclaimer, the term of this patent is extended or adjusted under 35 U.S.C. 154(b) by 167 days.

(21) Appl. No.: 17/955,969

(22) Filed: Sep. 29, 2022

(65) Prior Publication Data

US 2023/0024771 A1 Jan. 26, 2023

Related U.S. Application Data

(63) Continuation-in-part of application No. 17/089,609, filed on Nov. 4, 2020.

(51) Int. Cl.
*A01K 5/01* (2006.01)
*A01K 7/00* (2006.01)
(Continued)

(52) U.S. Cl.
CPC ............ *A47G 19/02* (2013.01); *A01K 5/0114* (2013.01); *A01K 7/00* (2013.01); *B65D 25/2885* (2013.01); *B65D 25/30* (2013.01)

(58) Field of Classification Search
CPC ...... A01K 5/0114; A01K 5/01; A01K 5/0121; A01K 5/0128; A01K 5/0135; A01K 7/00;
(Continued)

(56) References Cited

U.S. PATENT DOCUMENTS

| 995,114 A | 6/1911 | Clark |
| 1,394,540 A * | 10/1921 | Diack .................. A61C 5/68 |
| | | 433/97 |

(Continued)

FOREIGN PATENT DOCUMENTS

| EP | 3994979 | 5/2022 |
| WO | 2009137798 | 11/2009 |

OTHER PUBLICATIONS

Office Action in U.S. Appl. No. 17/089,609, mailed Jul. 20, 2023, 13 pages.

(Continued)

*Primary Examiner* — Gideon R Weinerth
(74) *Attorney, Agent, or Firm* — Ganz Law, PC

(57) ABSTRACT

A vessel, e.g., a bowl, suited for holding water or foodstuff for use as a pet bowl or human kitchen houseware may be. The bowl may have a modular design to allow for different portions of the bowl to have different attributes. The vessel is scaled for use by pets or humans. Generally, this means that an inner surface of the vessel defines a volumetric space of 60 cubic centimeters to 30 liters for holding water or foodstuff. The bowl has a water level, and, at the water level, the surface area of the bowl may be 56 cm to 900 square cm. To facilitate lifting and gripping by one or two human hands of a user, the vessel's outer surface may include one or more graspable elements disposed between the top and bottom of the vessel. Each graspable element is configured to receive one or more fingers of a user so that the user can grasp or otherwise engage the graspable element and lift the bowl from a surface when the bowl is upright on the surface.

13 Claims, 14 Drawing Sheets

(51) Int. Cl.
  *A47G 19/02*  (2006.01)
  *A47G 19/22*  (2006.01)
  *B65D 25/28*  (2006.01)
  *B65D 25/30*  (2006.01)

(58) Field of Classification Search
  CPC .... A01K 7/005; A47G 19/02; B65D 25/2885;
  B65D 25/30
  USPC ........ 119/72; 215/384; 220/574, 771, 710.5,
  220/758; D7/360, 543, 545, 523, 540,
  D7/554.1, 584, 586, 587, 588; D9/307,
  D9/668; D30/129, 132, 133
  See application file for complete search history.

(56) References Cited

U.S. PATENT DOCUMENTS

| | | | | |
|---|---|---|---|---|
| 1,583,512 | A | 5/1926 | Worth | |
| 1,938,909 | A | 12/1933 | Ernest | |
| D112,179 | S * | 11/1938 | Reinecke | D7/584 |
| 2,142,811 | A | 1/1939 | Agonis | |
| 2,327,078 | A * | 8/1943 | Teetor | A47G 23/02 |
| | | | | 215/6 |
| 2,479,765 | A | 8/1949 | Mower | |
| D162,085 | S * | 2/1951 | Rogers | 220/772 |
| 2,543,465 | A * | 2/1951 | Morey | A01K 5/0114 |
| | | | | 119/61.5 |
| 2,548,035 | A | 4/1951 | Horace | |
| D168,092 | S * | 11/1952 | Jon | D11/153 |
| D170,289 | S * | 8/1953 | Skipp | D7/523 |
| 2,661,951 | A | 12/1953 | Uhas | |
| 2,703,712 | A | 3/1955 | Obenchain | |
| D196,375 | S | 9/1963 | Fraudetter | |
| 3,198,377 | A | 8/1965 | Buckley | |
| 3,441,003 | A * | 4/1969 | Lister | A01K 5/0114 |
| | | | | 43/121 |
| 3,527,192 | A * | 9/1970 | Thomas | A01K 5/0128 |
| | | | | 119/61.5 |
| 3,611,998 | A * | 10/1971 | Loscalzo | A01K 5/0114 |
| | | | | D30/129 |
| 3,622,036 | A | 11/1971 | Bongaerts | |
| D254,416 | S * | 3/1980 | Abbate | D7/584 |
| D256,205 | S * | 8/1980 | Bateman | D7/630 |
| D257,068 | S * | 9/1980 | Imhoff | D30/129 |
| D257,494 | S | 11/1980 | Imhoff | |
| 4,257,353 | A | 3/1981 | Imhoff | |
| 4,712,698 | A | 12/1987 | Greenberg | |
| 4,767,015 | A | 8/1988 | Ho | |
| 4,886,016 | A | 12/1989 | Atchley | |
| 4,967,918 | A | 11/1990 | Long | |
| D312,895 | S | 12/1990 | Goetz | |
| D314,310 | S * | 2/1991 | Pyle | D7/548 |
| 5,000,123 | A | 3/1991 | Morse et al. | |
| D320,859 | S * | 10/1991 | Malcolm | D24/197 |
| 5,069,166 | A * | 12/1991 | Ahuna | A01K 5/0142 |
| | | | | 119/61.53 |
| D326,168 | S * | 5/1992 | Smith | D30/129 |
| D327,775 | S | 7/1992 | Turner | |
| 5,215,203 | A * | 6/1993 | Malcolm | A61J 9/00 |
| | | | | 215/11.1 |
| D340,077 | S | 10/1993 | Turner | |
| D351,522 | S * | 10/1994 | Deimler | D7/545 |
| D353,233 | S * | 12/1994 | Robles | D7/545 |
| D371,721 | S * | 7/1996 | Redmond | D7/508 |
| D383,254 | S * | 9/1997 | Feldman | D30/129 |
| 5,758,604 | A | 6/1998 | Jorgensen | |
| D400,400 | S | 11/1998 | Hurst | |
| 5,857,427 | A | 1/1999 | Kelley | |
| 5,865,147 | A | 2/1999 | Rubin | |
| 5,868,272 | A | 2/1999 | Deal | |
| D410,781 | S * | 6/1999 | Sharon | D30/129 |
| 5,979,361 | A | 11/1999 | Willinger | |
| 6,026,982 | A | 2/2000 | Caruthers | |
| 6,032,824 | A | 3/2000 | Barrow | |
| D424,757 | S | 5/2000 | Cooper | |
| 6,230,653 | B1 | 5/2001 | Tobin | |
| 6,237,532 | B1 * | 5/2001 | Derr | A01K 5/0121 |
| | | | | 119/51.01 |
| D443,478 | S * | 6/2001 | Miller | D7/558 |
| D454,990 | S | 3/2002 | Lorenzana | |
| D465,384 | S * | 11/2002 | Schanzer | D7/584 |
| D467,044 | S | 12/2002 | Tangolics | |
| 6,516,747 | B1 | 2/2003 | Willinger | |
| 6,520,369 | B1 | 2/2003 | Cytacki | |
| D471,677 | S | 3/2003 | Northrop | |
| D472,021 | S | 3/2003 | Northrop | |
| 6,561,375 | B1 | 5/2003 | Nagy | |
| 7,104,413 | B2 | 9/2006 | Liu | |
| D533,749 | S * | 12/2006 | Guzzini | D7/565 |
| 7,198,171 | B2 | 4/2007 | Liu | |
| D563,607 | S * | 3/2008 | Northrop | D30/129 |
| D598,252 | S * | 8/2009 | West | D7/698 |
| D602,651 | S | 10/2009 | Modi et al. | |
| D636,945 | S | 4/2011 | Anderson | |
| D659,296 | S | 5/2012 | Anderson | |
| 8,342,350 | B2 | 1/2013 | Jain | |
| D681,885 | S | 5/2013 | Pitter | |
| 8,459,490 | B1 | 6/2013 | McTaggart | |
| 8,646,413 | B2 | 2/2014 | Padia | |
| D703,393 | S | 4/2014 | Henley | |
| D705,077 | S | 5/2014 | Martin | |
| D721,860 | S | 1/2015 | Parks | |
| D723,874 | S * | 3/2015 | Marques | D7/559 |
| 8,997,691 | B2 | 4/2015 | Lipscomb et al. | |
| 9,102,194 | B2 * | 8/2015 | Duckett | B44D 3/14 |
| D741,024 | S | 10/2015 | Liu | |
| D748,947 | S | 2/2016 | Wirth, Jr. | |
| D748,949 | S | 2/2016 | Wirth, Jr. | |
| D749,366 | S | 2/2016 | Wirth, Jr. | |
| D749,367 | S | 2/2016 | Wirth, Jr. | |
| D755,447 | S * | 5/2016 | Andrews | D30/129 |
| 9,392,767 | B2 * | 7/2016 | Talt | A01K 5/0128 |
| D772,722 | S | 11/2016 | Kick | |
| 9,695,289 | B1 * | 7/2017 | Bao | B29C 43/021 |
| 9,814,332 | B2 | 11/2017 | Zimmerman | |
| D820,528 | S | 6/2018 | Warwarick | |
| D828,647 | S * | 9/2018 | Bergeron | D30/129 |
| D832,529 | S | 10/2018 | Elliott | |
| D833,087 | S | 11/2018 | Nieves | |
| D836,852 | S * | 12/2018 | Abbott | D30/129 |
| D868,391 | S | 11/2019 | Townsend | |
| D869,241 | S | 12/2019 | Ellison et al. | |
| D871,159 | S | 12/2019 | Ellison et al. | |
| 10,729,261 | B2 | 8/2020 | Ellison et al. | |
| D909,819 | S | 2/2021 | Ellison et al. | |
| D911,780 | S | 3/2021 | Ellison et al. | |
| D918,488 | S | 5/2021 | Kerr | |
| D929,670 | S | 8/2021 | Gong | |
| 11,111,056 | B2 | 9/2021 | Chisholm | |
| D945,714 | S | 3/2022 | Kerr | |
| D950,859 | S | 5/2022 | Delano | |
| D953,654 | S | 5/2022 | Kerr | |
| D959,061 | S | 7/2022 | Laemle | |
| D980,549 | S | 3/2023 | Xiao | |
| 11,602,126 | B1 * | 3/2023 | Delano | A01K 5/0135 |
| D988,806 | S * | 6/2023 | Harris | D7/505 |
| D997,647 | S | 9/2023 | Mandel | |
| D1,008,572 | S | 12/2023 | Clarke | |
| D1,019,010 | S | 3/2024 | Su | |
| 2005/0039689 | A1 | 2/2005 | Mossmer | |
| 2006/0027585 | A1 | 2/2006 | Clamage | |
| 2006/0179743 | A1 | 8/2006 | Kishbaugh et al. | |
| 2007/0034161 | A1 | 2/2007 | Thompson | |
| 2008/0105694 | A1 | 5/2008 | Chen | |
| 2008/0289581 | A1 | 11/2008 | Cox, Jr. et al. | |
| 2009/0126641 | A1 | 5/2009 | Anderson et al. | |
| 2010/0077963 | A1 | 4/2010 | Lipscomb et al. | |
| 2010/0101499 | A1 | 4/2010 | Gibson | |
| 2010/0275852 | A1 | 11/2010 | Lipscomb | |
| 2010/0313814 | A1 | 12/2010 | Huang | |
| 2012/0210941 | A1 | 8/2012 | Brown | |
| 2012/0228312 | A1 | 9/2012 | Sutherland | |
| 2014/0158054 | A1 | 6/2014 | Clarke | |

(56) References Cited

U.S. PATENT DOCUMENTS

| | | | |
|---|---|---|---|
| 2014/0209619 A1 | 7/2014 | Born et al. | |
| 2014/0261202 A1* | 9/2014 | Beatty | A01K 5/0128 |
| | | | 119/61.54 |
| 2014/0326189 A1 | 11/2014 | Jain | |
| 2015/0059651 A1* | 3/2015 | Talt | A01K 5/0121 |
| | | | 119/61.5 |
| 2017/0055491 A1* | 3/2017 | Hsu | B65D 21/0216 |
| 2017/0071376 A1 | 3/2017 | Vandenlangenberg | |
| 2017/0127645 A1 | 5/2017 | O'Donnel | |
| 2018/0014505 A1 | 1/2018 | MacNeil et al. | |
| 2018/0092477 A1 | 4/2018 | Duncan | |
| 2018/0132665 A1* | 5/2018 | Brown | A47J 43/0727 |
| 2018/0168126 A1 | 6/2018 | Gibbs | |
| 2018/0343826 A1 | 12/2018 | Kumar | |
| 2019/0248545 A1 | 8/2019 | Matteucci et al. | |
| 2019/0343070 A1 | 11/2019 | Padia | |
| 2020/0100607 A1 | 4/2020 | Ellison et al. | |
| 2020/0198837 A1 | 6/2020 | Chisholm | |
| 2020/0329891 A1 | 10/2020 | Ellison et al. | |
| 2021/0219753 A1 | 7/2021 | Ellison et al. | |
| 2022/0073261 A1* | 3/2022 | Mudd | F25D 3/06 |
| 2022/0095816 A1 | 3/2022 | Garnara | |
| 2022/0132797 A1 | 5/2022 | Hardy | |
| 2022/0159926 A1* | 5/2022 | Yim | A01K 5/0135 |
| 2023/0024771 A1 | 1/2023 | Hardy | |
| 2023/0404027 A1 | 12/2023 | Zou | |

OTHER PUBLICATIONS

Extended European Search Report for Application No. 23200794.8, mailed Feb. 8, 2024, 9 pages.

PetRageous Design, Pet Bowls, (https://www.petrageousdesigns.com/s.nl.sc.2/category.20966/.f) last accessed Jun. 4, 2021, publication date prior to application filing date.

Best Pet Supplies, Inc., Single Pet Bowl, (https://www.bestpethouse.com/products/accessories/pet-bowl/1083) last accessed Jun. 4, 2021, publication date prior to application filing date.

The Green Pet Shop Bamboo Cat Water Bowl, (https://www.amazon.com/Bamboo-Water-Bowl-Round-Angled-Blue/dp/B007TSOO8U) Last accessed Jun. 4, 2021, publication date prior to application filing date.

Catguru, Round Cat Dish, (https://www.cat-guru.com/collections/feeding-solutions/products/round-cat-dish?variant=16360367947842) last accessed Jun. 4, 2021, publication date prior to application filing date.

Frisco Double-Sided Ceramic Elevated Cat Bowl (https://www.chewy.com/frisco-double-sided-ceramic-elevated/dp/258589) last accessed Jun. 4, 2021, publication date prior to application filing.

Extended European Search Report for Application No. 201206184.0, mailed Apr. 11, 2022, 9 pages.

Notice of Allowance in U.S. Appl. No. 17/089,609, mailed Aug. 5, 2024, 8 pages.

Final Office Action for U.S. Appl. No. 17/089,609, mailed Nov. 4, 2020, 21 pages.

* cited by examiner

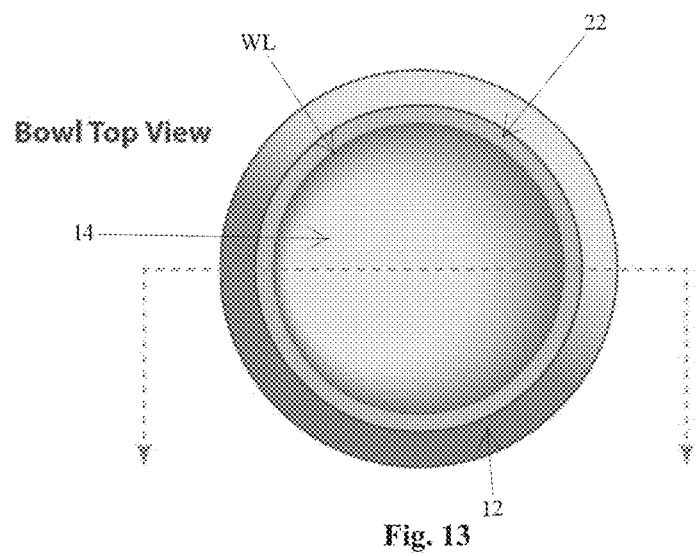
Fig. 13
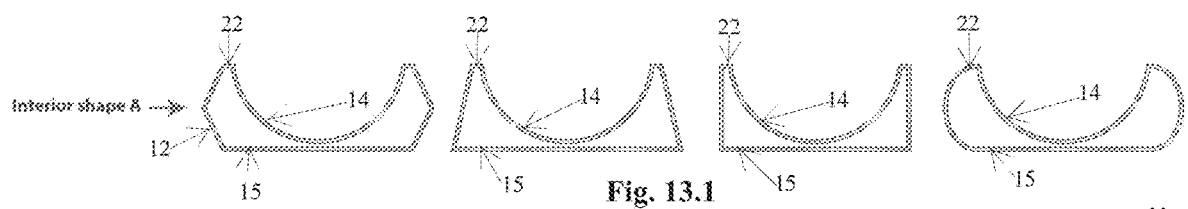
Fig. 13.1
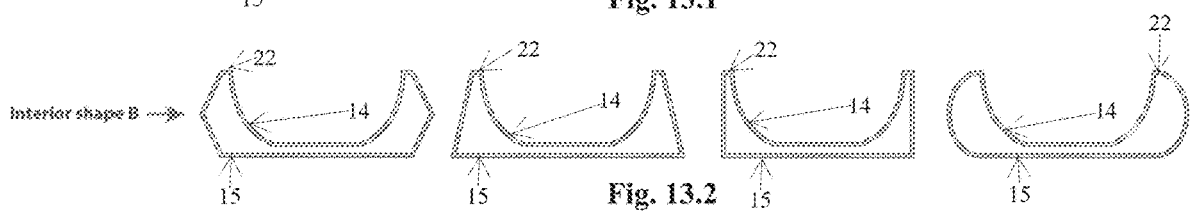
Fig. 13.2
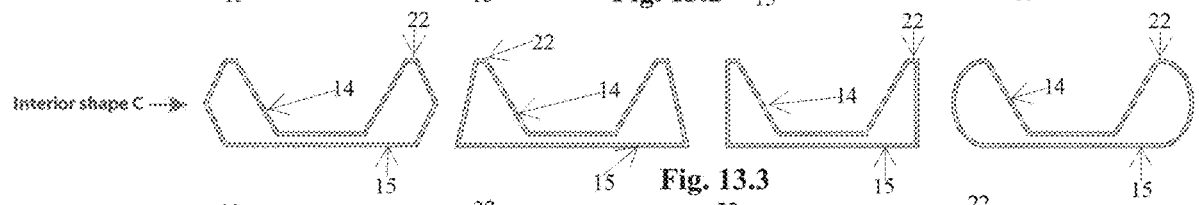
Fig. 13.3
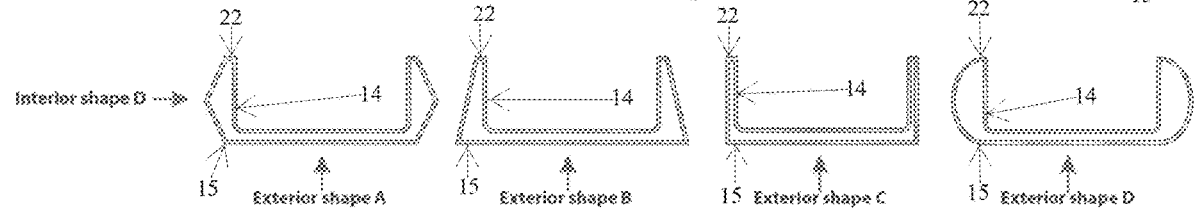
Fig. 13.4

Fig. 13.5
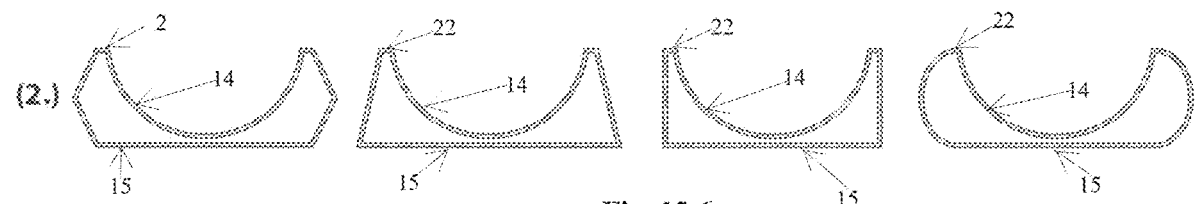
Fig. 13.6
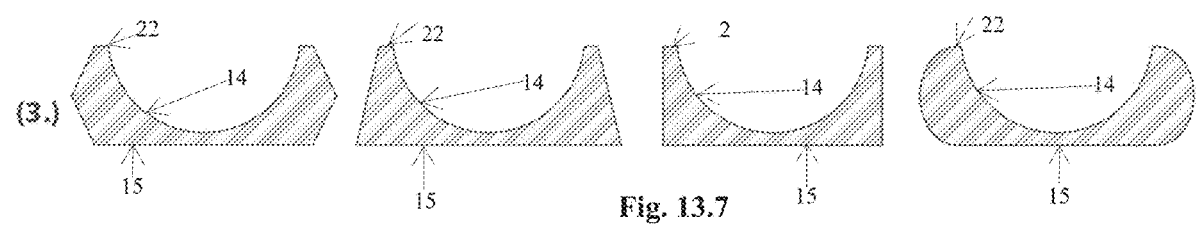
Fig. 13.7

ERGONOMIC BOWLS AND OTHER VESSELS FOR WATER AND FOODSTUFF

BACKGROUND

The inventive subject matter is generally directed to bowls and other vessels for holding liquids or solids. It is particularly directed to water or food bowls for pets, but it is also directed to houseware for humans. The inventive bowls and vessels are ergonomically configured with surface features that facilitate easy lifting and gripping of the item.

Conventional pet food and water bowls and household utility bowls have smooth sides, which, when coupled with a conical, rounded, vertical or other shape, can be difficult to pick up from the floor or other supporting surface—the user's hands and fingers are denied a graspable feature. A single hand will just slide over the smooth surface walls. Or the user must grasp over both the outer and inner walls at the same time, which may force the user to place fingers into a bowl and into its contents, often wetting or sullying the user's hand with contaminated or repulsive, water or spoiled food. The user may try to avoid this exposure by tightly and awkwardly clamping both hands on the outside of the vessel. Medium and large household utility bowls can be very heavy when filled with liquid or solids. The smooth sides prevent a secure hold on the bowl. The lack of secure grip on a smooth surfaced bowl may be compounded by normal household things coated on hands, e.g., flour, water, oil, and other substances.

Accordingly, there is a need for improved bowls and other vessels for pets and human houseware that enable a user to easily and securely grasp and pick-up the vessel from the exterior of the bowl without the need to put fingers inside the wet or dirty bowl, or without awkward, insecure clamping of hands on the slippery outer surface of the bowl or other vessel.

SUMMARY

This inventive subject matter overcomes the aforementioned and other problems in the prior art by providing a vessel that is configured with surface features that are easily grasped from the exterior of the vessel while it is on a grounded surface. The user does not need to place fingers into the vessel or under the vessel to grasp and lift it. In certain embodiments, the inventive subject matter is directed to a modular bowl assembly that includes such ergonomic graspable elements.

In certain embodiments, the inventive subject matter is directed to a vessel, e.g., a bowl, suited for holding water or foodstuff for use as a pet bowl or human kitchen houseware. The vessel is scaled for use by pets or humans. Generally, this means that an inner surface of the vessel defines a volumetric space of 60 cubic centimeters to 30 liters for holding water or foodstuff. The bowl has a water level, and, at the water level, the surface area of the bowl being 56 cm to 900 square cm. To facilitate lifting and gripping by one or two human hands of a user, the vessel's outer surface includes one or more graspable elements disposed between the top and bottom of the vessel. Each graspable element is configured to receive one or more fingers of a user so that the user can grasp or otherwise engage the graspable element and lift the bowl from a surface when the bowl is upright on the surface.

In some embodiments, the inventive subject matter is directed to a modular vessel that is suited for holding water or foodstuff. The modular vessel may include two or more portions that permanently or removably assemble/disassemble. The portions may include a surround portion and one or more of: (i) a basin portion, and/or a (ii) base portion. The assembled portions define an inner wall surface and an outer wall surface, the inner and outer surfaces each having a profile shape. For vessels intended for holding water or foodstuff for animals or humans, the inner surface typically would define a volumetric space of 60 cubic centimeters to 30 liters or thereabout such endpoints and including any point within the range. The bowl may have a water level (i.e., highest point in vessel before water spills out), and, at the water level, the surface area of the vessel may be 45 cm to 4500 square cm or thereabout such endpoints and including any point within the range.

In the foregoing and other embodiment, the portions may be removably assembled.

In the foregoing and other embodiments, the surround portion may receive and surround the basin portion.

In the foregoing and other embodiments, the surround portion may be assembled with a basin portion and a base portion, a lower section of the basin portion inserting through the surround portion and coupling to the base portion.

In the foregoing and other embodiments, the surround portion and basin portion may consist of different materials.

In the foregoing and other embodiments, the outer wall surface of the surround portion may include one or more graspable, each graspable element being configured to receive one or more fingers of a user so that the user can grasp the graspable element and lift the bowl from a surface when the bowl is upright on the surface, without having to place the fingers within the volumetric space or under the vessel.

In the foregoing and other embodiments, the basin portion may consist of metal, and the surround portion may consist of rubber or plastic.

In the foregoing and other embodiments, there may be at least two graspable elements, the two graspable elements being spaced about the perimeter of the outer wall surface between 30-180 degrees apart.

In the foregoing and other embodiments, the graspable elements may be sized and arranged to provide a group of two of more finger holes or slots accessible by fingers from a single hand, at least two of the holes or slots being arranged at different heights on the outer wall surface.

In the foregoing and other embodiments, there may be three graspable elements comprising two lower holes for the index and middle finger (or any adjacent fingers) and a single top hole for the user's thumb, the holes being spaced so that three fingers from a single hand can be simultaneously inserted into the holes.

In the foregoing and other embodiments, there may be a plurality of sets of the two or more groups of finger holes or slots.

In the foregoing and other embodiments, the groups may be separated by discernible gaps.

In the foregoing and other embodiments, the groups may be closely spaced, giving the impression of two vertically staggered rows of holes evenly spaced around the perimeter of a bowl or vessel.

In the foregoing and other embodiments repeated groupings of three holes may be at the same level or they may alternately be vertically staggered with alternating groups of three holes being above or below the adjacent groupings of three holes.

In the foregoing and other embodiments, a group of three holes, a center of the top hole may be located between the lower holes, allowing the user's index finger, middle finger (lower holes) and thumb (upper holes) to lift the bowl or vessel from virtually any angle or position around the bowl or vessel.

In the foregoing and other embodiments, the graspable elements may consist of multiple deep grooves horizontally or vertically oriented around the circumference of the bowl, and the graspable elements may include opposing sides that can be pinched by fingers.

In the foregoing and other embodiments there may be at least three graspable elements spaced equidistantly about the perimeter of the outer wall surface.

In another possible embodiment, the inventive subject matter is directed to a method of making a modular vessel that is suited for holding water or foodstuff. The steps in making the vessel may include: providing a surround portion and one or more of: (i) a basin portion, and/or a (ii) base portion; and assembling the provided portions to define an inner wall surface and an outer wall surface, the inner and outer surfaces each having a profile shape. The steps may include configuring the modular vessel according to any of the profile, shapes, and other attributes contemplated herein.

In another possible embodiment, the inventive subject matter is directed to a modular vessel that is suited for holding water or foodstuff, the vessel including a surround portion and one or more of: (i) a basin portion, and/or a (ii) base portion. The assembled portions define an inner wall surface and an outer wall surface, the inner and outer surfaces each having a profile shape, the inner surface defines a volumetric space of 60 cubic centimeters to 30 liters for holding water or foodstuff, the bowl having a water level, and, at the water level, the surface area of the vessel may be 45 cm to 4500 square cm. The surround portion may be assembled with a basin portion and a base portion, a lower section of the basin portion inserting through the surround portion and coupling to the base portion. The surround portion and basin portions consist of different materials. The outer wall surface of the surround portion includes one or more graspable elements between the top and bottom of the vessel. Each graspable element is configured to receive one or more fingers of a user so that the user can grasp the graspable element and lift the bowl from a surface when the bowl is upright on the surface without having to place the fingers within the volumetric space or under the vessel.

In the foregoing and other embodiments, at least the vessel's inner wall surface defining the volumetric space may be a water impervious material.

In the foregoing and other embodiments, the vessel may consist of a shatterproof material.

In the foregoing and other embodiments, the vessel may consist of metal, rubber, and/or plastic to impart the water imperviousness and shatterproofness.

In the foregoing and other embodiments, the vessel may have a double wall construction, the outer wall being space from the inner wall along a majority of the perimeter of the vessel.

In the foregoing and other embodiments, the vessel may have a low center of gravity so that resists toppling over if bumped or nudged.

In the foregoing and other embodiments, the height of the vessel may be between 30 mm to 250 mm.

In the foregoing and other embodiments, the vessel's outer diameter at the bottom of the vessel may be plus/minus within 25% of the inner diameter at WL.

In the foregoing and other embodiments, the outer wall profile shape of the vessel may be generally conically, with the vessel tapering from a wider bottom to a narrower top.

In the foregoing and other embodiments, the outer wall profile may be different from the inner wall profile.

In the foregoing and other embodiments, at least the outer wall profile may have a widest portion at or below half its height.

In the foregoing and other embodiments, the outer wall profile may be a conical or annular shape.

In the foregoing and other embodiments, the graspable elements may not extend above outer surface and may be disposed in apertures that are configured for fingers to reach in.

In the foregoing and other embodiments, the graspable elements may include opposing sides that can be pinched by fingers.

In the foregoing and other embodiments, there may be at least three graspable elements, the graspable elements being spaced about the perimeter of the outer wall surface so that there is at least one every 180 degrees.

In the foregoing and other embodiments, there may be at least one graspable element every 120 degrees.

In the foregoing and other embodiments, there may be at least one graspable element every 90 degrees.

In the foregoing and other embodiments, there may be at least one graspable element present on the perimeter every 45 degrees or less.

In the foregoing and other embodiments, the graspable elements may be sized and arranged to provide a set of two of more finger holes or slots accessible by fingers from a single hand, at least two of the holes or slots being arranged at different heights on the outer wall surface.

In the foregoing and other embodiments, there may be three graspable elements in an arrangement like a bowling ball.

In the foregoing and other embodiments, there may be a plurality of spaced sets of the two or more finger holes or slots.

In the foregoing and other embodiments, the graspable elements may include handle like projections or structures.

In the foregoing and other embodiments, the vessel's graspable elements may also serve as legs or supports for the vessel.

In other embodiments, the inventive subject matter is directed to making vessels as contemplated above and elsewhere herein. For example, in one such possible embodiment is directed the steps of: (1) forming an inner wall surface and an outer wall surface, the inner and outer surfaces each having a profile shape, the inner surface defining a volumetric space of 60 cubic centimeters to 30 liters for holding water or foodstuff, the bowl having a water level, and, at the water level, the surface area of the vessel being 56 cm to 900 square cm; and (2) forming in the outer wall surface one or more graspable elements at the surface of the outer wall surface and between the top and bottom of the vessel, each graspable element being configured to receive one or more fingers of a user so that the user can grasp the graspable element and lift the bowl from a surface when the bowl is upright on the surface, without having to place the fingers within the volumetric space or under the vessel.

These and other embodiments are described in more detail in the following detailed descriptions and the figures. The following is a description of various inventive lines under the inventive subject matter. The appended claims, as originally filed in this document, or as subsequently amended, are hereby incorporated into this Summary section as if written directly in. The foregoing is not intended to be an exhaustive list of embodiments and features of the inventive subject matter. Persons skilled in the art can appreciate other embodiments and features from the following detailed description in conjunction with the drawings.

BRIEF DESCRIPTION OF THE DRAWINGS

The appended figures show embodiments according to the inventive subject matter, unless noted as showing prior art.

FIG. 13 shows a top view of yet another of a representative vessel with graspable elements and the taking of a selected cross section, which is used to illustrate various possible permutations of inner and outer wall profiles, as reflected in the series of profiles under each of FIGS. 13.1-13.7.

—FIG. 20A is an assembly view, FIG. 20B is an elevational view, and 20C is a bottom perspective view.

—FIG. 20A is an elevational view, and FIG. 20B is a bottom perspective view.

DETAILED DESCRIPTION

Figure 1:
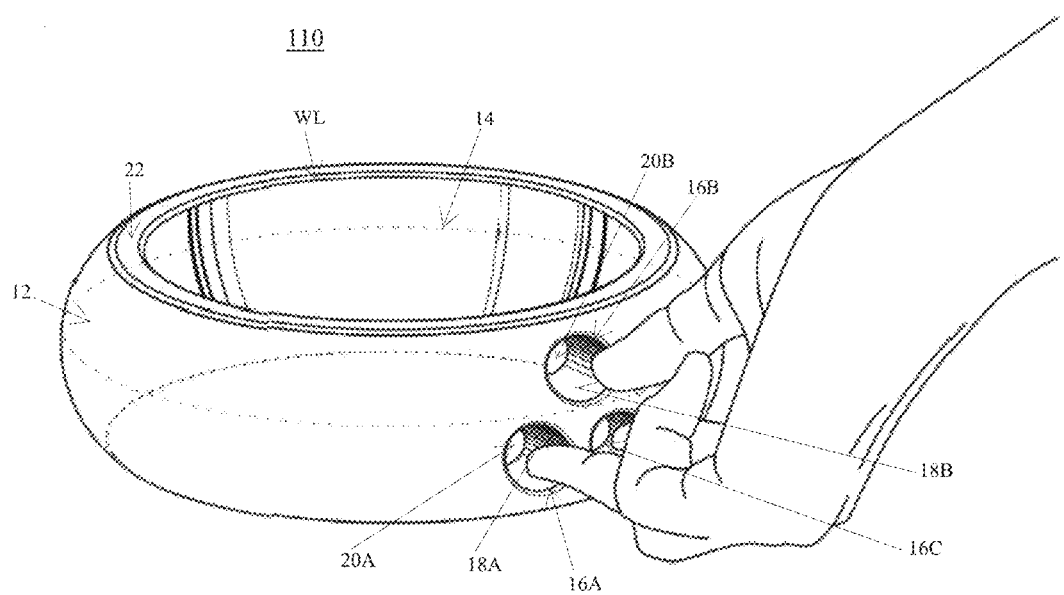
FIG. 1 shows a front perspective view of a vessel with graspable elements.

There are multiple ways that the inventive subject matter may be applied to a bowl or other vessel. While vessels for various purposes with many surface patterns are age old, the inventive subject is meant for vessels sized and shaped to hold water and food substances for serving pets around the size of dogs and cats, as well as humans. The vessels are sized and shaped to be liftable by one or two hands. They generally have walled sides and bottoms and open topsides. But the inventive subject matter could also be implemented in vessels that have closed or closeable tops.

The vessels' contemplated herein are made of relatively rigid materials sufficient to support water or food stuff. At least the vessels' inner wall surface for supporting water or other contents are inherently impervious to water or are treated to be such. The materials may be metal (e.g., stainless steel, copper, aluminum, titanium); polymers like plastic and rubber; natural, biomaterials (e.g., wood, bamboo, tempered glass and ceramics); and combinations of any of the foregoing materials. Any of these materials may have a smooth surface. (For at least housewares, ceramics and tempered glass are viable).

Generally, the foregoing materials, except ceramics and glass, are shatterproof under intended-use conditions. In contrast, materials like ceramics, glass, earthen clay or rock, cements, and plasters may not be ideal for use in some embodiments of the inventive subject matter because they may have sufficient porosity to not be impervious to water or they may be vulnerable to shattering or other breakage. They may also be difficult to configure with graspable features, be unduly heavy, or they may be too expensive for mass production.

Nonetheless, any of the foregoing materials may be used in the inventive subject matter depending on the application. For example, glass may not be suitable for use as pet bowl because of its intended use on a ground surface, making it vulnerable to being bumped around and breaking. However, a glass bowl for prepping or serving human food would be used on countertops and tables and is a fine choice for such applications.

The bowls or other vessels may be single or double-walled structures, namely there are inner and outer walls that are spaced apart. There may be some intervening material but as used herein a double wall bowl would have a majority of the space between inner and outer walls as open space. Double wall vessels may be open or closed at the bottom between the inner and outer walls, as indicated below, in more detail. The inventive subject matter is not limited to double-wall vessels—the bowls may also be fully solid between inner and outer wall surfaces or have a majority of solid in fill between the inner and outer wall surfaces.

The inventive subject matter also applies to single wall bowls that may result from different manufacturing methods and material applications. Injection molded, cast, ceramic or glass bowls could all be of single wall construction.

To enhance grip, embodiments of the inventive subject matter may have surface treatments of high grip materials (such as rubber or soft plastics). Similarly, texturing may be applied to all graspable surfaces or the bottom of the bowl for a more secure grip and to prevent sliding on the surface the bowl is placed upon.

Pet bowls typically have flat ground-contacting surfaces with straight or curved, smooth walls rising to a top rim. The flat ground-contacting surface is desirable because it helps keep the bowl stable from dislodging from its position. Therefore, fingers cannot be slipped under the bottom of the bowl to lift it. Accordingly, bowls of the inventive subject matter are often, but not necessarily always, directed to bowls and other vessels where there is a flat ground contacting surface.

Various shapes are used for pet bowls and other vessels so that they are not prone to toppling over if they are bumped or nudged. The common feature is that the vessels are shaped so that when they have a low center of gravity that resists toppling. A vessel with a low center of gravity is one where the center of gravity is at half the height of the vessel or lower. For example, as indicated in the Background section, certain shapes are often used for pet bowls. A conical shape is one example. The conical shape helps keep the bowl's center of gravity low by concentrating the mass of liquid or other contained substance in the bottom half of the bowl. In general, under the inventive subject matter, an empty vessel with a low center of gravity will also have a low center of gravity when full.

Accordingly, bowls of the inventive subject matter are often, but not necessarily always, directed to bowls and other vessels where is a low center of gravity. A low center of gravity may be provided in bowls and vessels that generally (but are not limited to) have a width to height aspect ratio of 16:3 to 1:1 though aspect ratios of 1:2 or greater may be adopted for specialty uses. In other cases, however, for example a bowl that generally tapers from bottom to top (e.g., a conical bowl), the bowl may have a low center of gravity but an aspect ratio where W/H is greater than 1:1 due to the mass in a filled bowl being concentrated in the bottom half of the bowl. Bowls with lower W/H aspect ratios, e.g., tall skinny bowls, may also have a low center of gravity by weighting the bottom of the bowl. In the case of pet bowls, it may be desirable to make bowls taller so that pets do not need to stoop low to reach the bowl.

Suitable vessels for use as pet bowls and houseware, will typically have a width or diameter of from 75 mm to 350 mm or more. Suitable vessels for use as pet bowls and houseware, will typically have a height of from 30 mm to 250 mm or more. These references are to measurements of the bowl's volumetric space (internal width/diameter and height) that define a volumetric space for holding food, water or other substance, the space being defined by the bottom surface, sidewalls and the level to which water would rise in the vessel without spilling over the sidewalls, when placed on a flat surface (Hereinafter that level may be referred to as the "Water Level" or "WL" in the Figures). The vessel's outer diameter at the bottom of the vessel would generally be plus/minus within 25% of the inner diameter at WL, but it could be within 40% or more, for example, in the case of bowls with decorative effects.

Suitable vessels for use as pet bowls and houseware, will typically have a cross-sectional area (surface area) at the Water Level that ranges from 56 cm to 900 square cm or more.

Suitable vessels for use as pet bowls and houseware, will typically have a volumetric space that ranges from 60 cubic centimeters to 30 liters.

The vessels according to the inventive subject matter may combine any one or more of the foregoing parameters of materials and material properties, aspect ratios, widths, heights, surface areas at WL, and volumes. In the following sections, various representative embodiments are disclosed. For example, in one, non-limiting, example, an inventive bowl is made of a smooth, impervious material metal or plastic. It has a W/H aspect ratio of 2 to 1 and holds 250 cubic centimeters, where W is the widest part of the bowl at the outer wall surface and the widest part is at half the height of the bowl or lower so that the bowl has a low center of gravity.

Having described some basic parameters that may be suitable for the contemplated pet bowls and houseware, the following section of this disclosure details various way to implement such bowls and others with inventive graspable features. The following is a general summary of several categories of graspable features:

Summary of Representative Inventive Subject Matter

Here follow some general summaries of inventive subject matter.

I. Recessed Handle(s) Elements

A first solution contemplates inclusion of multiple holes or indentations on the exterior sidewall or surface of the bowl. These can look and function like the holes on a bowling ball or recessed cabinet handles. One or multiple recesses are sized, shaped and positioned to enable single or multiple fingers to securely grasp the bowl from the outer, bottom (or a combination of both) surface of the bowl, remaining clean and not contacting the interior surface of the bowl.

Multiple deep grooves in the side of the bowl or around the circumference of the bowl are another solution enabling the user to easily grasp the raised or recessed ridges on the exterior of the bowl.

II. Raised Handle(s) Elements

A second solution contemplates a singular or multiple protruding shapes, raised bars, flutes or handle(s) like extensions/protuberance on the side of the bowl. These raised bars can be vertical, horizontal or angled in one or multiple locations around the perimeter of the bowl. These raised elements may be placed at even or odd intervals around the perimeter of the bowl. These raised or recessed elements may be spherical, flat, literal handles or shapes designed to look like an elegant vessel or sculptural elements with the purpose of offering single or multiple locations for gripping the bowl. The solution could include ornamental features in the graspable elements, e.g., animal heads or tails extending from the bowl functioning as handles.

III. Combination of Recessed and Raised Handle(s) Elements

A third solution contemplates inclusion of one or multiple holes or indentations on the exterior wall or surface of the bowl combined with raised elements adjacent to the hole or indentation can enhance the user's ability to grip the bowl. Combining both recessed and raised elements to form a grip able element can help improve the functionality of the handle, simplify manufacturing, and offer additional design opportunities.

IV. Bowl Legs Functioning as Handles

A fourth solution contemplates inclusion of multiple legs, bars, fins, supporting structures or other elements, which can act as both handles, legs and supports enabling fingers to securely grip or grasp the bowl from the outside remaining clean. Bowl legs may incorporate different shapes and cross sections to be purely functional, functional, and decorative or functional and whimsical. These legs can be ornamental, such as but not limited to a caricature of an octopus, or any animal real or fictitious. These leg/handles can also be designed to look like branches or plants. Legs or other supporting elements may be combined with holes in the sidewall of the bowl vessel.

In some embodiments, the graspable elements are finger openings of from 10 mm to 50 mm or more diameter or major width. In other embodiments the graspable elements are openings for multiple finger openings from 35 MM to 130+MM. It is also possible that the graspable elements can run continuously around the entire circumference of the sidewall of the bowl vessel. It is also possible that the graspable elements can run continuously up (vertically or at an angle) the entire sidewall of the bowl vessel. In other embodiments. The graspable elements are positive or negative surface projections (indentations or extensions) that project outward and/or inward from 10 mm to 76 mm or more from the general outer surface of the vessel.

All the indentations or extensions in the various embodiments contemplated herein may be either the same or different material from that of the bowl itself. The vessel can be a monolithic (one piece) structure or assembled from multiple pieces of the same or different materials.

In general, there is at least on graspable element that can be engaged and lifted by pinching or hooking fingers on or through and against the element. In some embodiments, opposite sides of the vessel each include a graspable element. In yet other embodiments three or four or more graspable elements are spaced around the perimeter of the vessel so that the bowl can be grasped at different side positions. For example, rotating around a center point of the bowl, graspable elements could be located every 180, 120, 90, 60, 30, 10 degrees apart. The graspable elements could be separated by 0.125, 0.25, 0.5, 2, 3, 4, 5, 6, 7, 8, 9, 10, 15, 20, 25, 30, 40, 50 inches apart around. They can be spaced equidistantly from each other or at irregular spacings.

The following embodiments represent pet watering or food bowls or houseware bowls. However, using the principles of the inventive subject matter may be used in other kinds of vessels. Therefore, the following examples are illustrative and not intended to be limiting.

LIST OF REFERENCE NUMBERS LABELING THE FIGURES*

WL top of bowl's water level
10 bowl
12 outer walls of bowl (exterior surface)
14 interior surfaces of inner wall
15 bottom walls of bowl
16 graspable element
18 sidewalls defining the graspable element
20 inner walls of bowl (interior surface)
22 top rim walls, the area spanning between inner and outer walls
24 indented or notched area in or in between graspable elements
26 basin portion
28 surround portion
30 base or footing portion
32 threaded elements on base
34 complementary threaded elements on another portion of bowl
36, 38 top opposing abutment surfaces on different bowl portions
40, 42 bottom opposing abutment surfaces on different bowl portions FIG. 1: Recessed Handle(s) Elements.

In certain embodiments, the inventive subject matter contemplates inclusion of recessed features, e.g., multiple apertures or indentations, on the exterior side wall or surface of a bowl 110. In this embodiment, the outer surface 12 is free of protrusions and has a smooth continuous outer surface, except where interrupted by the apertures. The interior of the holes may be made from the same material of the bowl or a different material to enhance grip and comfort. The interior of the holes may have a texture different from the exterior of the bowl for improving the functionality/grip.

Bowl 110 has an outer wall 12 with a generally toroidal or annular shape. In this and other embodiments discussed below, the bowl has an inner wall 14 with an interior surface that defines a volumetric space for holding water or other contents. Water Level (WL) defines the top of the volume. The exterior surface of wall 14 is indicated by reference number 20.

The graspable elements 16A-C are defined by cylindrical sidewalls 18A-C, which engage the fingers and define the finger-receiving apertures or indentations. The apertures are tunnels with closed ends 20A-C As seen, the apertures look and function like the holes on a bowling ball. The apertures or indentations can also function like recessed cabinet handles. One or multiple recesses enabling fingers to securely grip the bowl from the outer or bottom surface of the bowl, remaining clean. The holes are sized and space for finger access for a range of normal human hand sizes. For example, holes may have center to center spacings of from less than 25 mm to greater than 50 mm. Two, three, three or four holes could be spaced the side of a bowl in an area of 25 to 160 square centimeters or more. The apertures or indentations have depth sufficient for a range of human finger sizes to recede into. Suitable diameters may be from 10 mm to 50 mm or more. Suitable depths may be from less than 10 mm to 76 mm or more.

Looking more particularly at the embodiments of FIGS. 1, 16, and 21A-B, a bowl featuring a singular grouping of three holes, multiple groupings of three holes, or repeating groupings of three holes placed continuously around the circumference of a bowl or vessel. A grouping of three holes is intended to allow easy lifting of a bowl or vessel not unlike the holes on a bowling ball. A single grouping of three holes, e.g., 16A, 16B, and 16C, may be described as featuring two lower holes (16A, 16C) for the index and middle finger (or any adjacent fingers) and a single top hole (16B) for the user's thumb. The holes are spaced so that three fingers from a single hand can be simultaneously inserted into the holes. A similar embodiment is seen in FIG. 17 where the pair of lower holes is replaced by a slot. The slot may have an upward facing concave curvature, as seen in FIG. 17. In the embodiment shown, the upper hole is disposed above a center portion of the slot.

The top hole may be centered or nested between the two lower holes, as illustrated in the Figures referenced above. The three holes may all be equally sized, or the top (thumb) hole may be larger than the two lower finger holes. The top hole may nest closely between the two lower holes, or the top hole may be spaced further above the two lower holes. The two lower holes may be spaced closely allowing comfortable insertion of two adjacent fingers. In summary, various groupings of holes and slots are contemplated, including the following:

1) A bowl or vessel may feature a single grouping of the aforementioned three holes allowing a single point of lifting the bowl or vessel with one hand.

2) Additionally, a bowl or vessel may feature multiple groupings of the aforementioned three holes equally or randomly spaced around the bowl, allowing lifting the bowl from multiple angles or allowing a user to use multiple hands simultaneously.

3) Another variation is a repeating pattern of the aforementioned grouping of three holes. These repeating groupings of three holes may have discernible gaps between the groupings of three holes, or the groupings of three holes may be closely spaced giving the impression of two vertically staggered rows (top and bottom) of holes evenly spaced around the perimeter of a bowl or vessel. Repeated groupings of three holes may be at the same level or they may alternately be vertically staggered with alternating groups of three holes being above or below the adjacent groupings of three holes. The center of the top holes may be located between the lower holes. This configuration allows the user's index finger, middle finger (lower holes) and thumb (upper holes) to lift the bowl or vessel from virtually any angle or position around the bowl or vessel.

Figure 3:
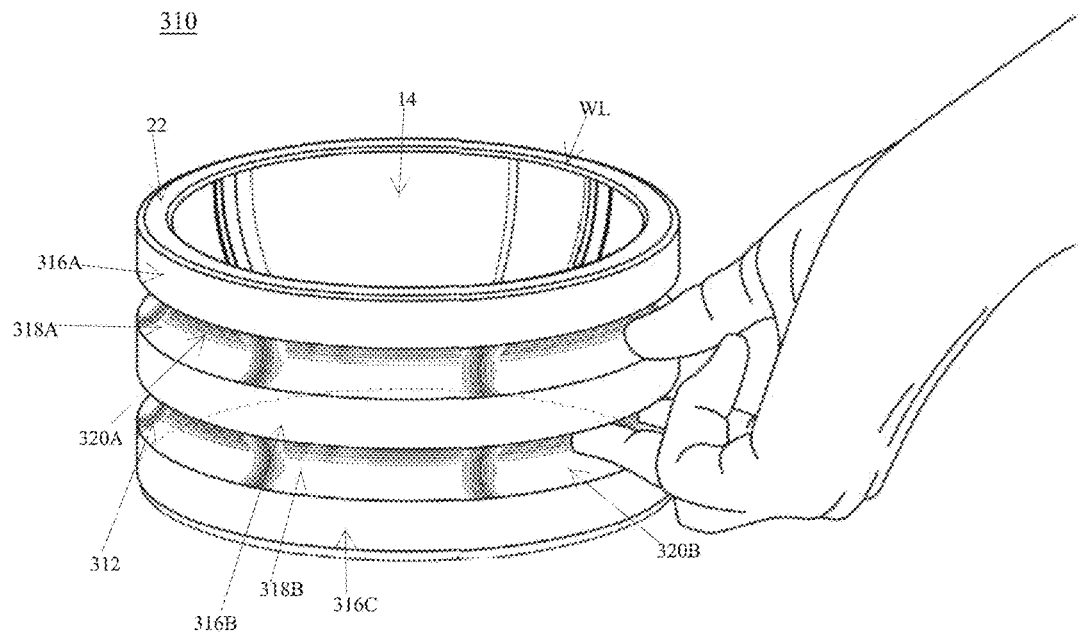
FIG. 3 shows a front perspective view of yet another alternative embodiment of a vessel with graspable elements.

Multiple deep grooves around the circumference of the bowl are another solution enabling the user to easily grasp the raised ridge or ridges on the outside of the bowl. The grooves can be oriented vertically or horizontally (as seen in FIG. 3, discussed below.)

Figure 2:
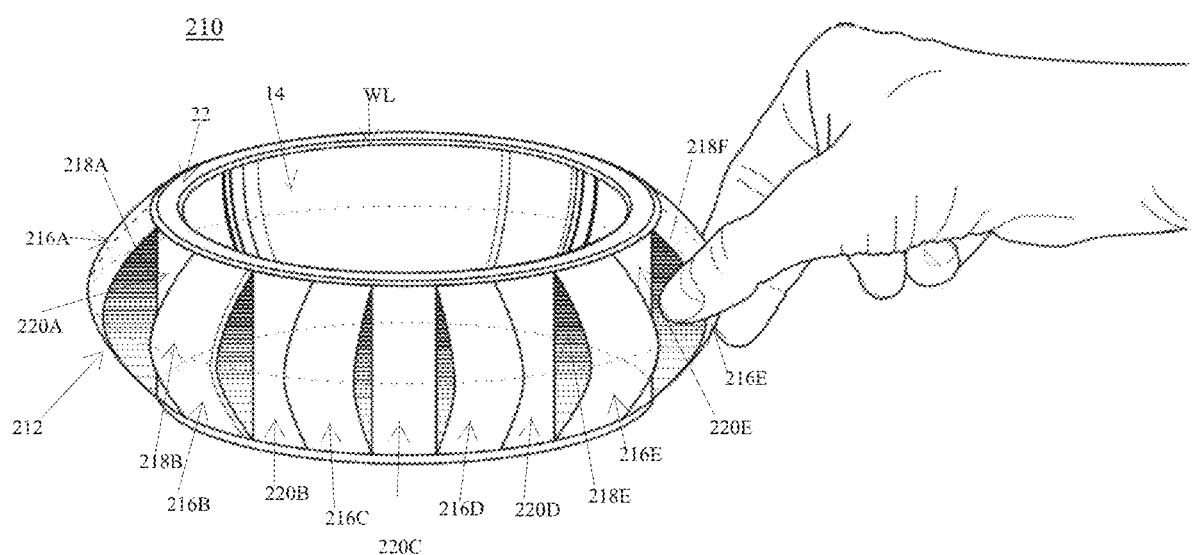
FIG. 2 shows a front perspective view of an alternative embodiment of a vessel with graspable elements.

FIG. 2—Combination of Recessed and Raised Handle(s) Elements.

In certain embodiments, the inventive subject matter contemplates graspable elements 216A-F in the form of single or multiple raised bars, flutes, or handle(s) like extensions/protuberance on the side of the bowl 210, which will allow lifting the bowl without touching the interior of the bowl. In FIG. 2, the bars are vertically oriented and seen spaced apart along intervals 220A-E on the bowl's inset inner wall 12. Each graspable element may be defined by two or more wall surfaces. In the case of bowl 210, each graspable element 216 is defined by three wall surfaces 218A-F. For example, walls 218A and 218E are side walls and wall 218B is a front wall surface. As another possibility, the side walls in graspable elements 216 could be eliminated so that the front wall, e.g., wall 218A is a handle that fingers can slip under and over.

In addition to a vertical orientation, the graspable element could be horizontally or otherwise angularly oriented. These raised elements may be spaced evenly or irregularly around the circumference of the bowl in one location or multiple locations around the perimeter of the bowl. The raised or recessed elements may be designed to look like an elegant vessel or sculptural shape with the side benefit of offering single or multiple locations for gripping the bowl. Looking at FIG. 2, the arching elements 216A-F may be arranged equidistantly around the perimeter of inner wall 14 to define the outer surface profile 212 generally as a toroidal or annular shape like the embodiment of FIG. 1.

FIG. 3—Recessed handle(s) elements or indentations on the exterior side wall or surface of the bowl.

FIG. 3 shows a bowl 310 with a series of three ridge-like, circumferentially extending graspable elements 316A-C. Side walls 318A-B define the elements. The sidewalls include a vertical face and horizontal faces, which merge into inner walls 320A-B. The sidewalls and inner walls define circumferential grooves between the graspable elements. These grooves or recesses can function like recessed cabinet handles. One or multiple recesses enabling fingers to securely grip the bowl from the outside, remaining clean. Multiple deep grooves around the circumference of the bowl are a solution enabling the user to easily grasp a single raised ridge or multiple ridges on the outside of the bowl.

Figure 4:
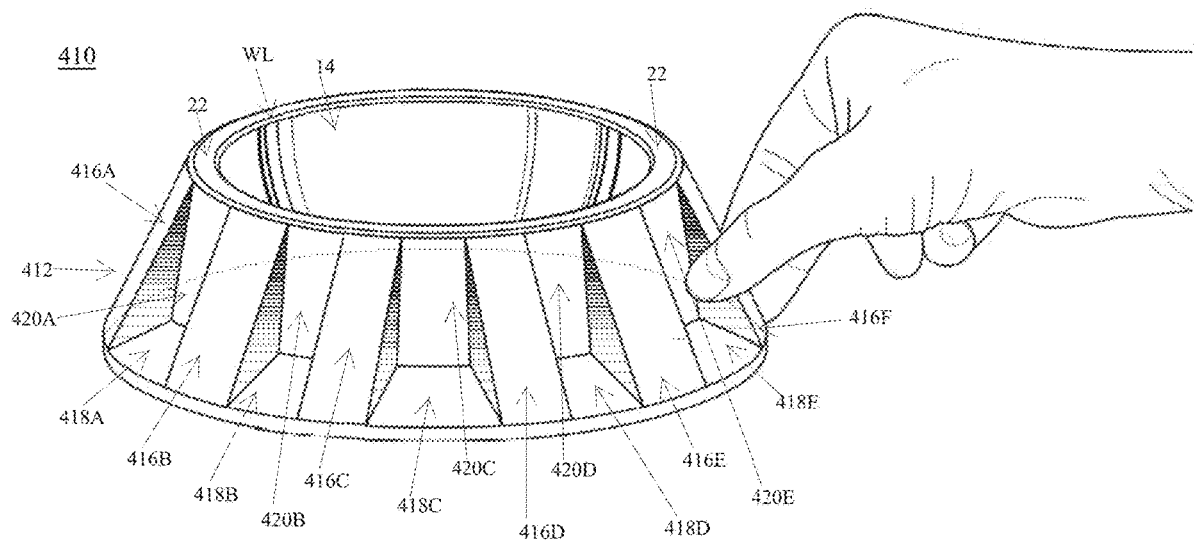
FIG. 4 shows a front perspective view of yet another alternative embodiment of a vessel with graspable elements.

FIG. 4—Combination of recessed and raised handle(s) elements.

The embodiment of FIG. 4 is like the embodiment of FIG. 2. In this case the bowl 410 has an outer profile of a truncated cone that tapers from the top of the Water Level to the bottom. The bowl has a plurality of graspable elements 416A-F in the nature of single or multiple triangular, rectangular, or organic raised bars, flutes, or handle(s) like extensions/protuberance on the side of the bowl. The elements allow lifting the bowl without touching the interior of the bowl. The raised bars can be vertical, horizontal, angled, or organic in shape and placement. These raised elements may be at even or odd intervals in one location or multiple locations around the perimeter of the bowl. These raised or recessed elements may be designed to look like an elegant vessel or sculptural shape with the side benefit of offering single or multiple locations for gripping the bowl.

Figure 5:
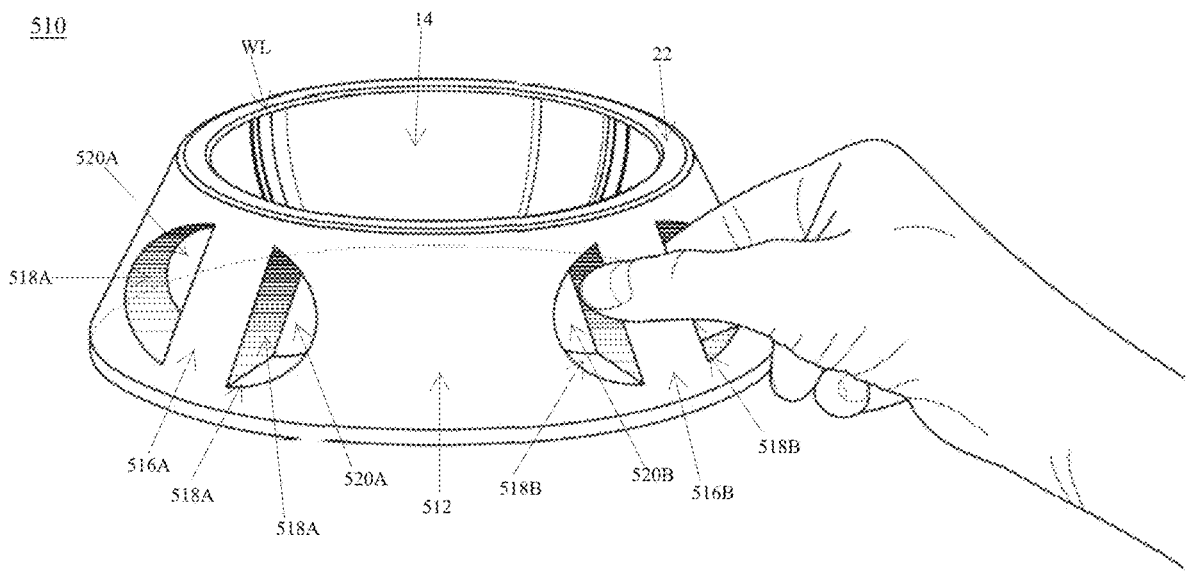
FIG. 5 shows a front perspective view of yet another alternative embodiment of a vessel with graspable elements.

FIG. 5—Recessed handle(s) elements.

The embodiment of FIG. 5 shows bowl 510 with an outer profile of a truncated cone that tapers from the top of the Water Level to the bottom. One or more graspable elements 516A-B are disposed in the outer wall. Each graspable element is a handle or bar disposed in an aperture in the outer wall 512. Like bowl 110, the remainder of the outer wall may be a smooth, unbroken surface.

Figure 6:
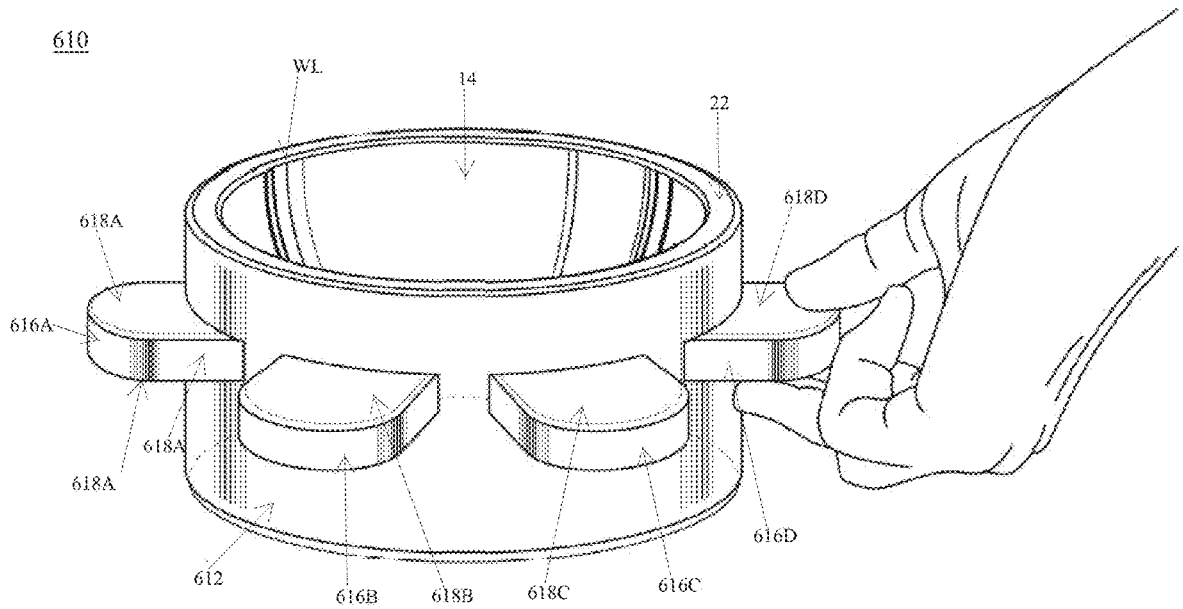
FIG. 6 shows a front perspective view of yet another alternative embodiment of a vessel with graspable elements.

FIG. 6—Raised handle(s) elements.

The embodiment of FIG. 6 shows bowl 610 with an outer profile in the general nature of a cylinder truncated. The diameter of outer wall 612 remains constant going from the top of the Water Level to the bottom (excepting the protruding graspable elements 616A-D.

The surface of outer wall 612 is provided with a single or multiple protruding shapes, raised bars, flutes or handle(s) like extensions to allow lifting the bowl without touching the interior of the bowl. These protruding elements can be oriented vertically, horizontally, or otherwise angularly. In this example, the graspable elements are horizontally oriented and spaced equidistantly around the circumference of outer wall 612. The projections terminate in an ovular end.

The projecting graspable elements may be placed at even or odd intervals, in a single location or multiple locations around the perimeter of the bowl. These raised or recessed elements may be spherical, common handles or shapes designed to look like an elegant vessel or sculptural element with the side benefit of offering single or multiple locations for gripping the bowl. In this embodiment, like some of the others, the bowl's outer surface may be smooth and even (except of the graspable element).

Figure 7:
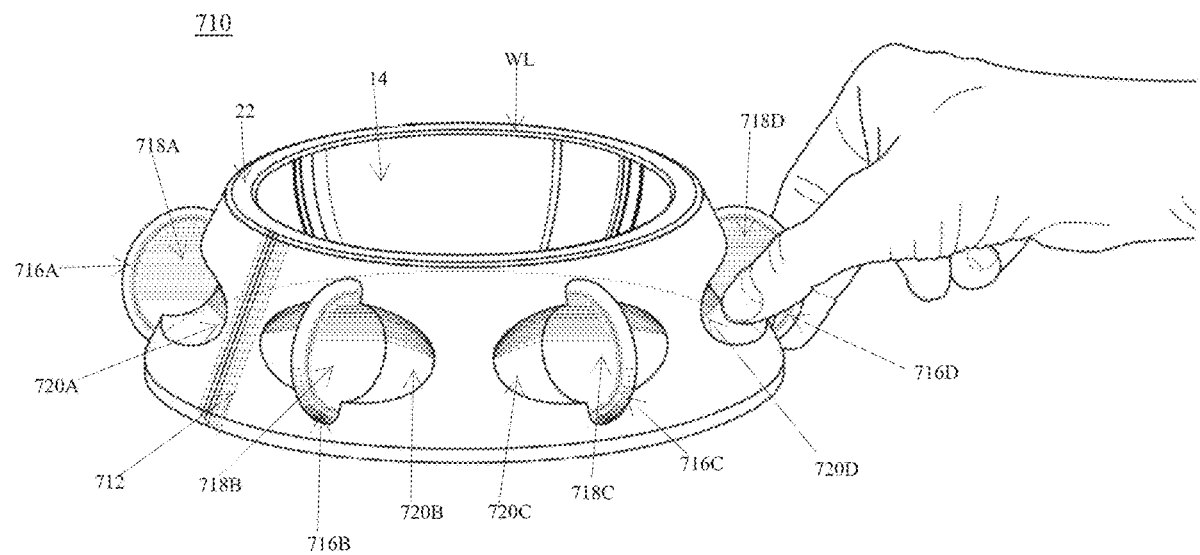
FIG. 7 shows a front perspective view of yet another alternative embodiment of a vessel with graspable elements.

FIG. 7—Combination of recessed and raised handle(s) elements.

In this embodiment, bowl 710 is like bowl 510 in FIG. 5. Here, the graspable elements 716A-D are disposed in indentations formed in the outer wall 712. The indentations may merge into inner wall 720 or they may be formed in the surrounding outer wall 712 or another intermediate structure.

Figure 8:
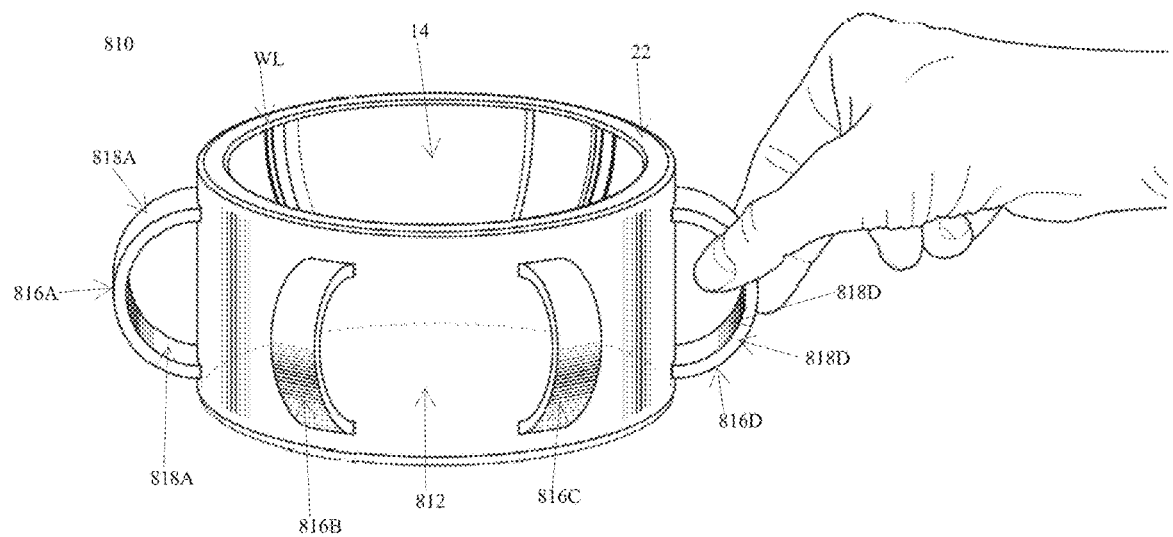
FIG. 8 shows a front perspective view of yet another alternative embodiment of a vessel with graspable elements.

FIG. 8—Raised handle(s) elements.

In this embodiment, bowl 810 is like bowl 610 of FIG. 6. Here, the graspable elements 816A-D are vertically oriented handles.

Figure 9:
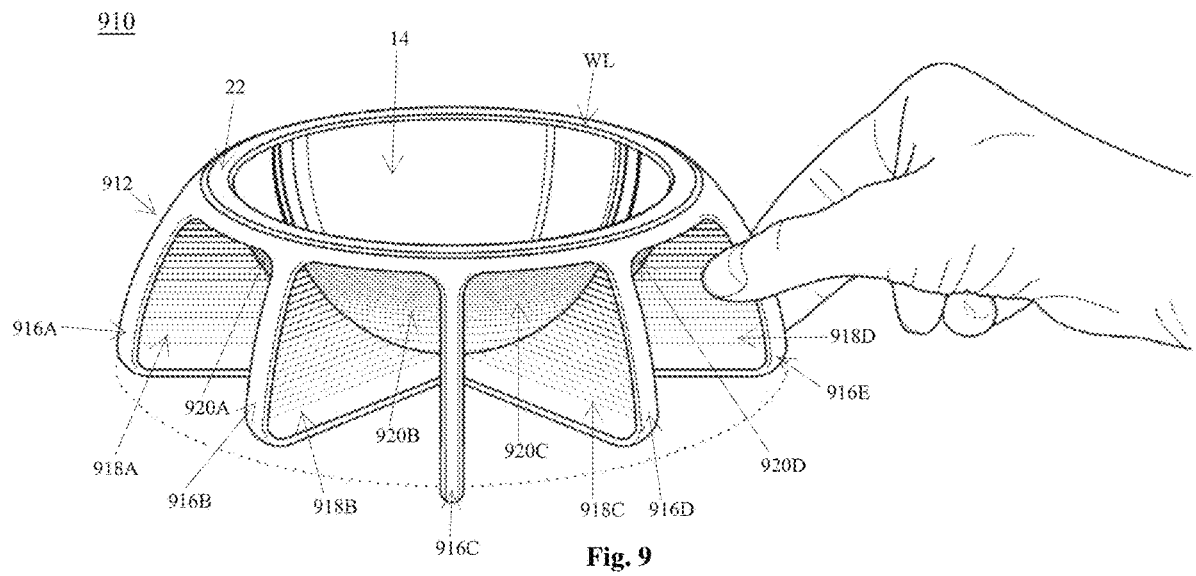
FIG. 9 shows a front perspective view of yet another alternative embodiment of a vessel with graspable elements.

FIG. 9—Bowl legs functioning as handles.

In this embodiment, bowl 910 has an outer wall surface or profile 912 that is circumferentially discontinuous. It is formed from a plurality of spaced apart graspable elements 916A-E in the nature of bars, fins, or other elements that are disposed on inner wall surface 920. In this embodiment, the graspable elements also serve as legs or supports, as well as handles. The graspable elements enable fingers to securely grip the bowl from the outside, while keeping fingers clean. These legs may be the same material as the bowl or a softer/textured material to enhance grip. In this example, the graspable elements are defined by pairs of side wall surfaces, e.g., walls 918A, 918B (respective opposing pair of surfaces not visible). A vertically oriented front wall surface, e.g., 916B is disposed between each pair of side wall surfaces at their exterior ends. The interior ends are disposed on interior wall 920. Each graspable element also has a bottom side that extends outwardly, horizontally from the inner wall until it merges with a front wall surface, e.g., surface 916B. Like in some other embodiments, the graspable elements are equidistantly, circumferentially spaced about the circular perimeter of inner wall 920.

The graspable element/bowl legs may incorporate different shapes and cross sections to be purely functional, functional, and decorative or functional and whimsical as in the case of making the legs resemble those of real of fictitious animals or characters. As seen the inner wall 920 defines a hemispherical or rounded volume for holding bowl contents. The same inner bowl configuration may be applied to any other embodiment disclosed or contemplated herein. As should be apparent from the teachings herein, the outer wall may be shaped to have the same or a quite different outer profile from the inner wall in the case of double-wall bowl constructions or constructions where there is solid between the inner bowl surface and the outer wall surface.

Figure 10:
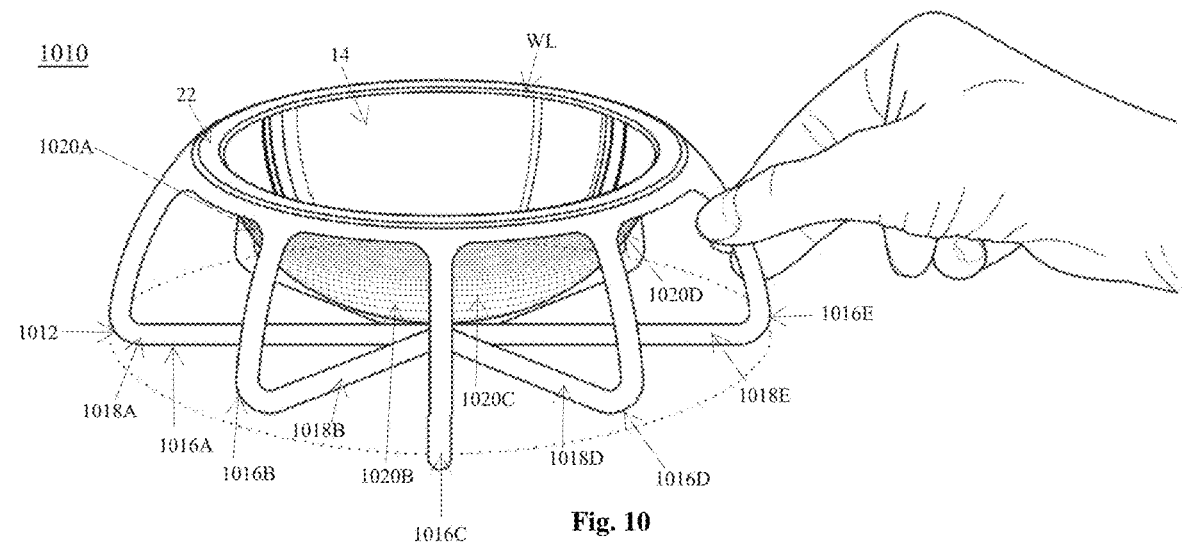
FIG. 10 shows a front perspective view of yet another alternative embodiment of a vessel with graspable elements.

FIG. 10 Bowl legs functioning as handles.

In this embodiment, bowl 1010 is like bowl 910 in FIG. 9. Here, the graspable elements do not have side walls, e.g., side walls 918A, 918B. Instead, the sidewall area is opened to make each graspable element 1016A-E a handle. (Each handle does have its own narrow sidewalls that define the handle opening, e.g., sidewalls 1018A-1018E.)

Figure 11:
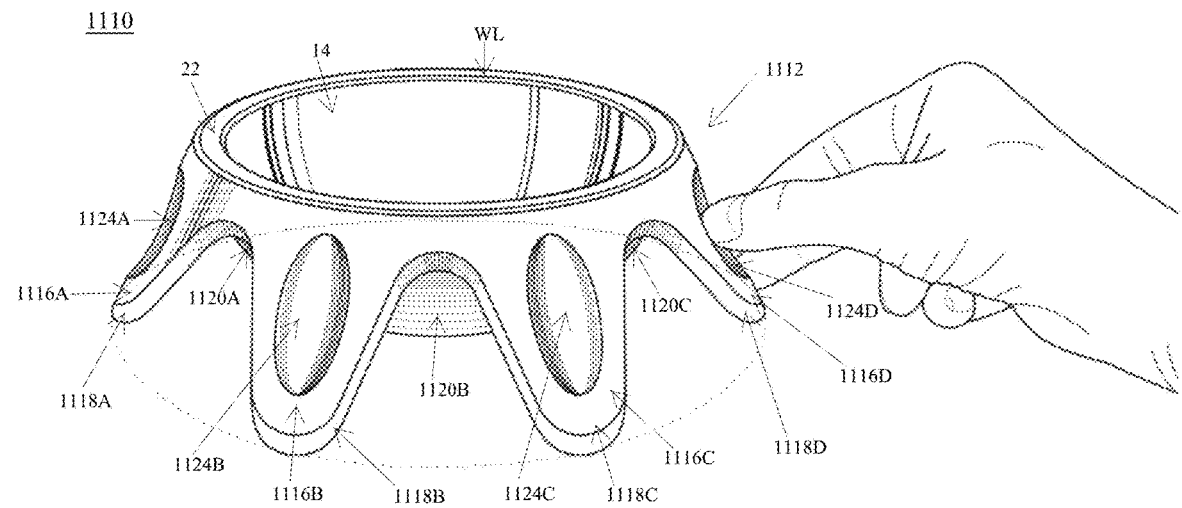
FIG. 11 shows a front perspective view of yet another alternative embodiment of a vessel with graspable elements.

FIG. 11—Bowl legs functioning as handles utilizing a combination of recessed and raised elements.

In this embodiment, bowl 1110 is like bowls 910 and 1010 in that the graspable elements 1116A-D also serve as legs or supports. In this case the legs extend vertically downwardly from a top surface of inner wall 1120. The legs are horizontally wider along the front surfaces, e.g., 1118A, 1118C. Indentations 1124A-D optionally may be formed in the front surfaces for enhances grip. Such indentations may be provided in various other embodiments of bowls. Alternatively, in this or any other embodiment, one or more surfaces of a graspable element may have another kind of grip enhancement feature, e.g., a silicone or other rubbery coating or insert, pronounced three-dimensional texture or perforations in the leg or sidewall material for additional grip.

Figure 12:
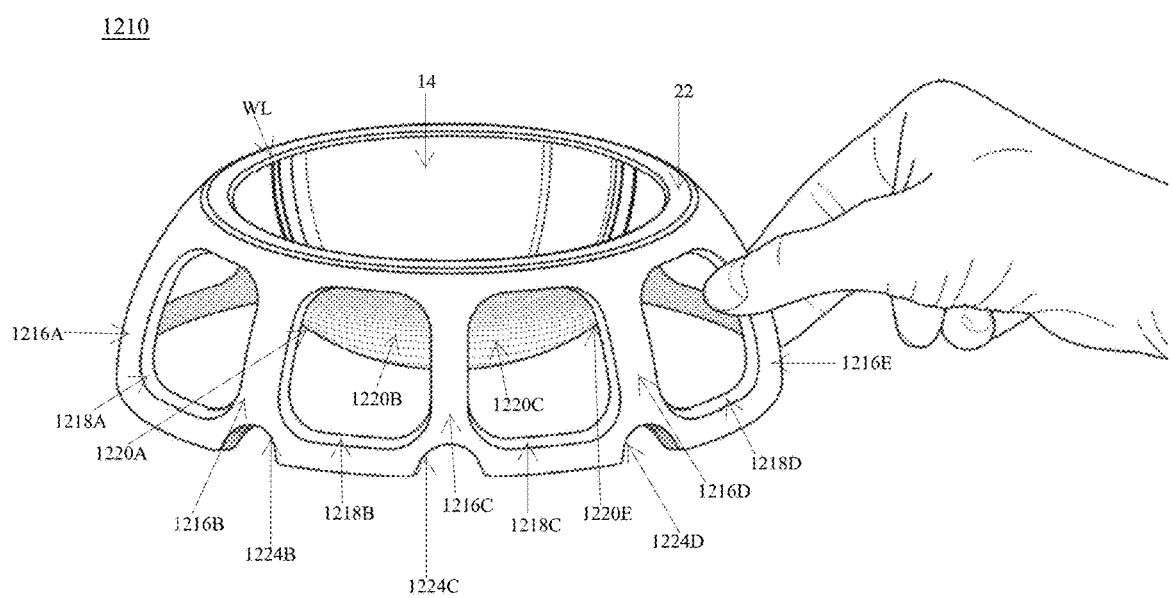
FIG. 12 shows a front perspective view of yet another alternative embodiment of a vessel with graspable elements.

FIG. 12—Bowl legs functioning as handles utilizing a combination of cut out, recessed and or raised elements.

In this embodiment, bowl 1210 like bowl 1110 in that it has graspable elements/supports 1216A-E that are disposed on just the top portion of inner wall 2020 and downwardly and outwardly therefrom. The graspable elements are interconnected at their bottoms by a ring. The rings may optionally include finger-sized notches or indentations 1224B-1224D so that fingers can be slipped under the bowl to help lift it. The graspable elements 1216A-E are separated by apertures and are generally like graspable elements 516A-B shown in bowl 510 of FIG. 5.

FIG. 13—Any interior and/or exterior bowl shape combination may incorporate the inventive subject matter.

FIG. 13 illustrates the taking of a cross-section (cross sections A.-A.) through a representative bowl 1310. (Generally, but not necessarily, the orthogonal cross-section, which is not shown would have a matching cross-section.) It is to be understood that this bowl's particular inner and outer wall profiles may be varied, as indicated in FIGS. 13.1-13.7. The following are some (not all) examples of varying interior and exterior shape combinations that can be incorporated into the inventive subject matter. In any case, the bowl may be open or closed at the bottom.

The bowl may be a:
1. A simple single wall construction (open at the bottom);
2. A double wall construction with a closed or open bottom; or
3. A solid-wall construction, with material spanning the inner and outer wall surfaces. (e.g., like a solid wood bowl).

The inner and outer profiles may be the same or different. FIG. 13.1 shows bowls with double wall constructions and closed bottoms 15. Inner wall, bowl surface 14 has a hemispherical or other rounded profile. The outer wall surface has a different profile, which, moving left to right, may range from (1) extending angularly outward from the bottom and then stepping angularly inward at a midsection; (2) truncated cone or tapering from top to bottom; (3) cylindrical; and (4) rounded or hemispherical.

FIG. 13.2 shows outer profiles that are the same or like those of FIG. 13.1. In this case, the inner profile is not completely rounded, it is flat on the bottom.

FIG. 13.3 shows outer profiles that are the same or like those of FIG. 13.1. In this case, the inner profile is rectilinear, not rounded. The inner profile is an inverted truncated cone, i.e., the bowl's bottom is flat, and the vertically oriented walls taper outwardly and openly from the bottom to top.

FIG. 13.4 shows bowls with an inner profile that is cylindrical in combination with outer profiles from FIGS. 13.1-13.3.

FIG. 13.5 shows various combinations of inner and outer profiles discussed above but without closed bottom 15.

FIG. 13.6 represents what could be a solid wood or solid cast (resin or synthetic stone etc.) construction.

FIG. 13.7 shows the same inner and outer profiles as FIG. 13.1 but in this case the bowl has a solid construction, with material infilled between inner surface 14 and outer surface 12.

Although bowls with round perimeters are shown in the Figures, the bowls or other vessels may be fabricated in many other shapes, including square or other polygon, oval, and irregular shapes.

Figure 14:
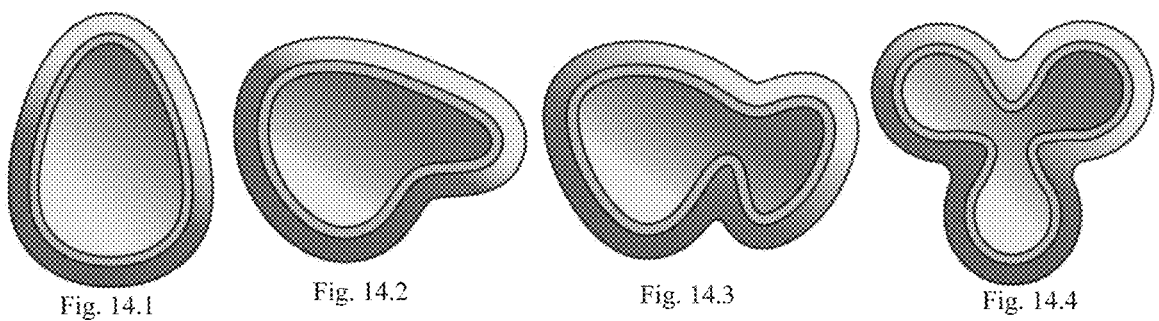
FIG. 14 illustrates a series (FIGS. 14.1-14.4) of representative top view profiles vessels with may have.

Looking at FIGS. 14.1-14.4, the bowl shape, viewed from the top, may be a regular uniform shape, for example, round (FIG. 14.1); square (FIG. 14.2); triangular (FIG. 14.3); and hexagonal (FIG. 14.4), elliptical (not shown), etc.

Figure 15:
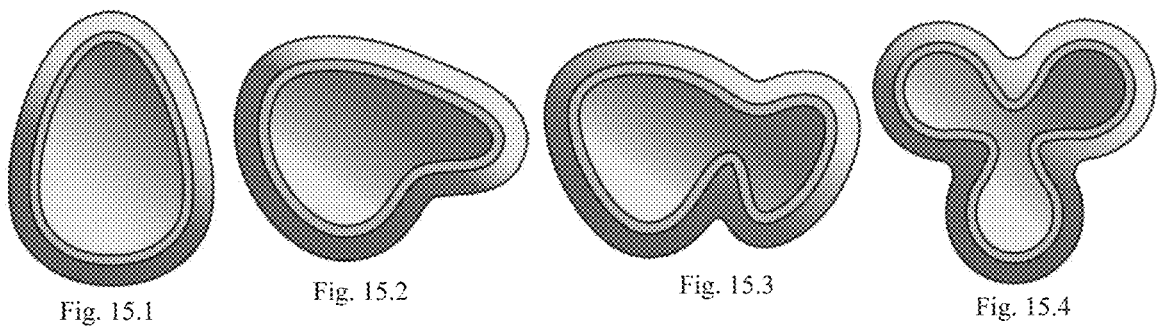
FIG. 15 illustrates another series (FIGS. 15.1-15.4) of representative top view profiles vessels may have.

Looking at FIGS. 15.1-15.4, the bowls or other vessels may have a simple organic shape (e.g., FIG. 15.1), an irregular organic shape (e.g., FIGS. 15.2-15.3), or a complex organic shape (e.g., FIG. 15.4). As examples, the shape can be ovoid (FIG. 15.1); kidney like (FIG. 115.2) butterfly-like or lobed (FIG. 15.3), i.e., connected in the middle with two shaped cavities on either side of the narrow area, which cavities can be the same or different size or shape; and symmetrically pedaled or lobed around a center point (FIG. 15.4).

As seen in FIGS. 1-15, from a top view, the bowls or vessels have a top perimeter that is concentrically within a larger bottom, ground-facing perimeter. Alternatively, as seen in FIGS. 16-19, the bottom perimeter could be concentrically within a larger top perimeter.

Figure 16:
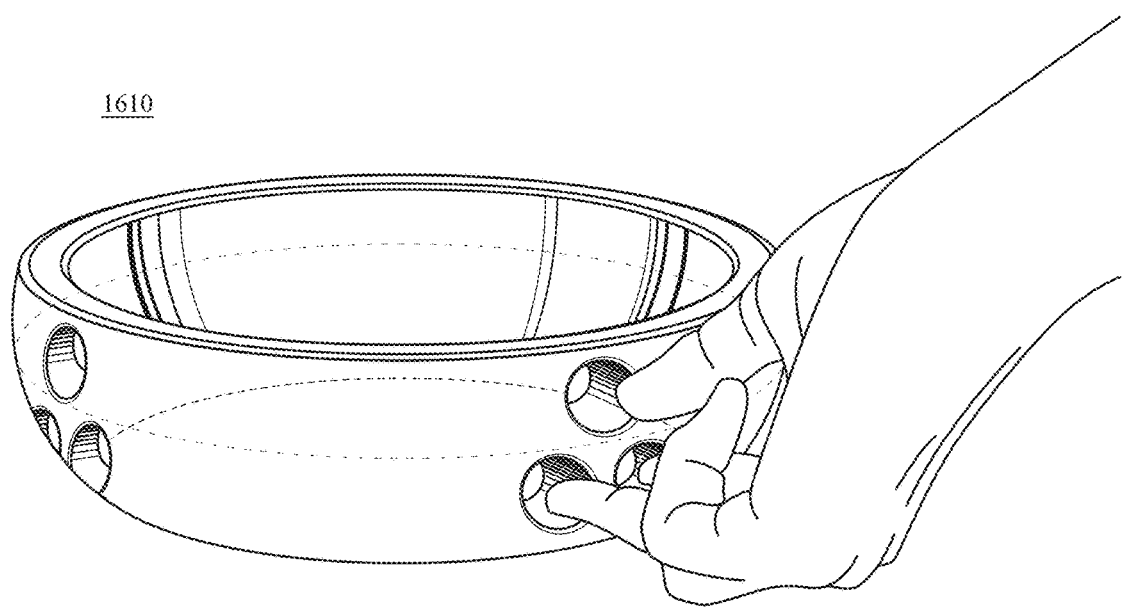
FIG. 16 shows a front perspective view of yet another alternative embodiment of a vessel with graspable elements.
Figure 17:
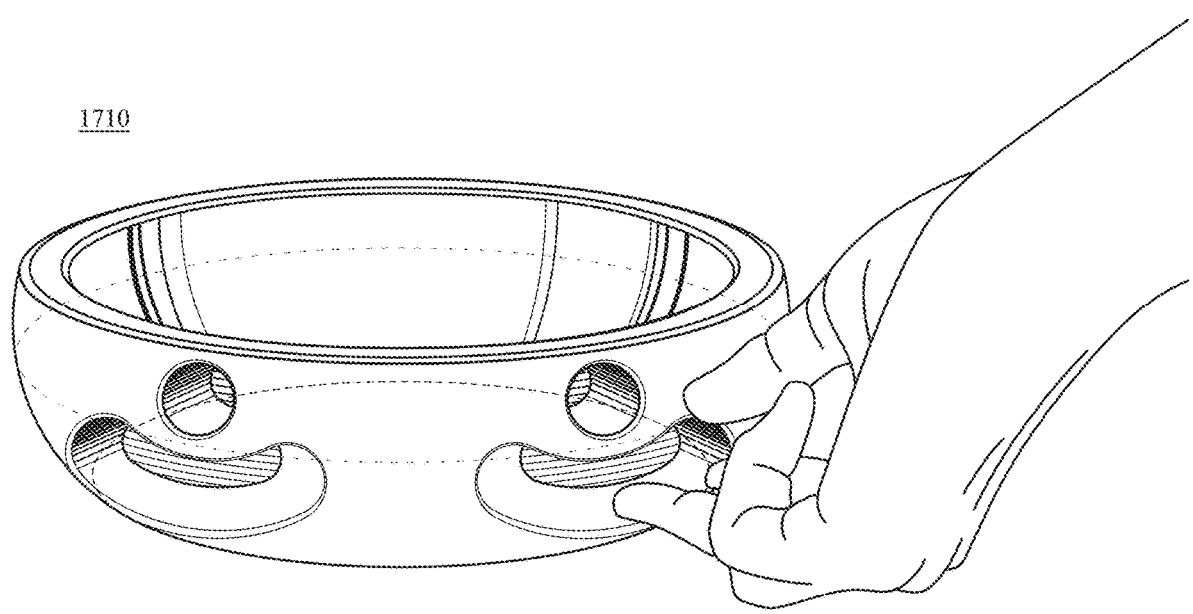
FIG. 17 shows a front perspective view of yet another alternative embodiment of a vessel with graspable elements.

FIG. 16 shows a bowl 1610 with a set of apertured graspable elements like found in a bowling ball, and as also seen in bowl 110 of FIG. 1. The graspable elements are sized and arranged to provide a set of three of more finger holes that are accessible by fingers from a single hand. There is a single top hole and two lower holes. In the case of FIG. 16 there are two, spaced-apart sets of such bowling ball holes. Bowl 1610 has a solid or double-wall construction and a closed bottom.

FIG. 17 shows a variation of the bowl 1610 where the bottom two graspable elements are merged together in an elongate, upwardly curving slot that allows two or more fingers entry for grasping.

Figure 18:
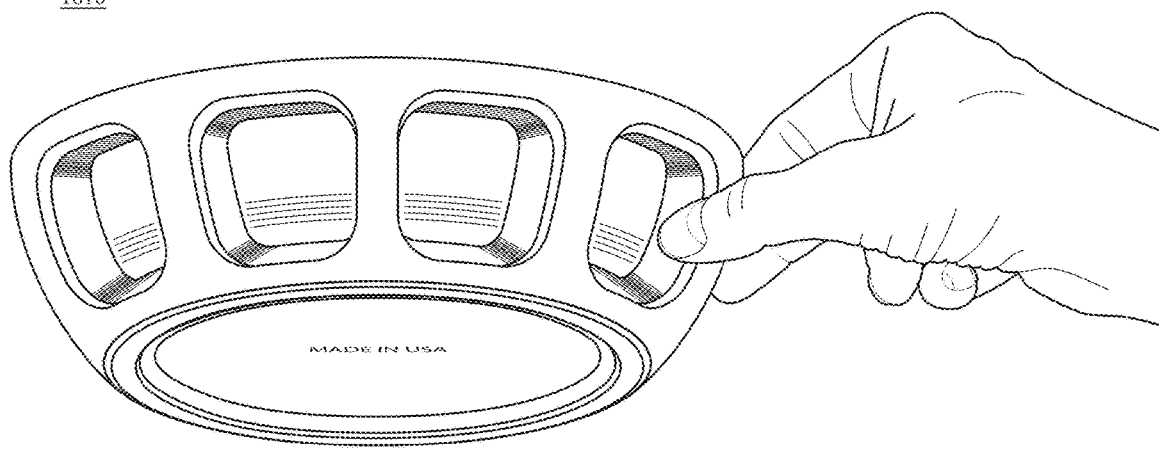
FIG. 18 shows a front, bottom perspective view of yet another alternative embodiment of a vessel with graspable elements.

FIG. 18 shows a bowl 1810 with an arrangement of graspable elements similar to those seen in bowl 1210 of FIG. 12. Bowl 1810 has a solid or double-wall construction and a closed bottom.

Figure 19:
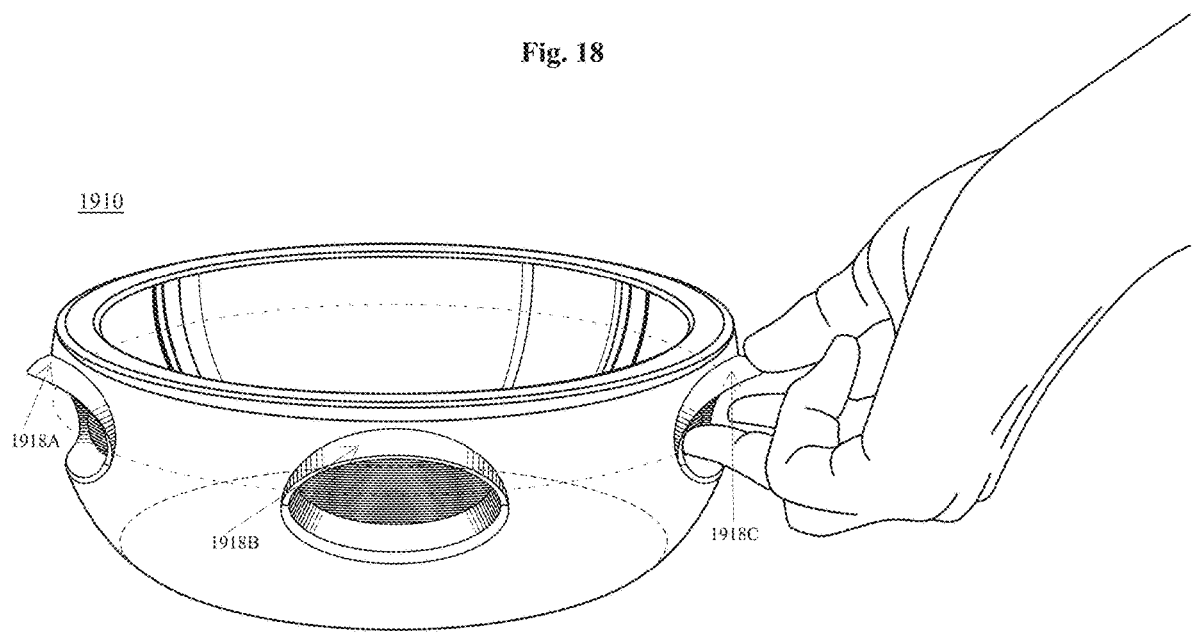
FIG. 19 shows a front perspective view of yet another alternative embodiment of a vessel with graspable elements.

FIG. 19 shows a bowl 1910 with an arrangement of graspable elements that are recessed or apertured somewhat similar to those seen in bowl 710 of FIG. 7. However, instead of vertically oriented sidewalls 718 running vertically down the middle of the aperture, the perimeter of the aperture can have a projecting lip 1918A-C for grasping, the projecting lip can be disposed partially, intermittently or fully around the perimeter.

Bowl Materials/Assembly/Construction

Figure 20A:
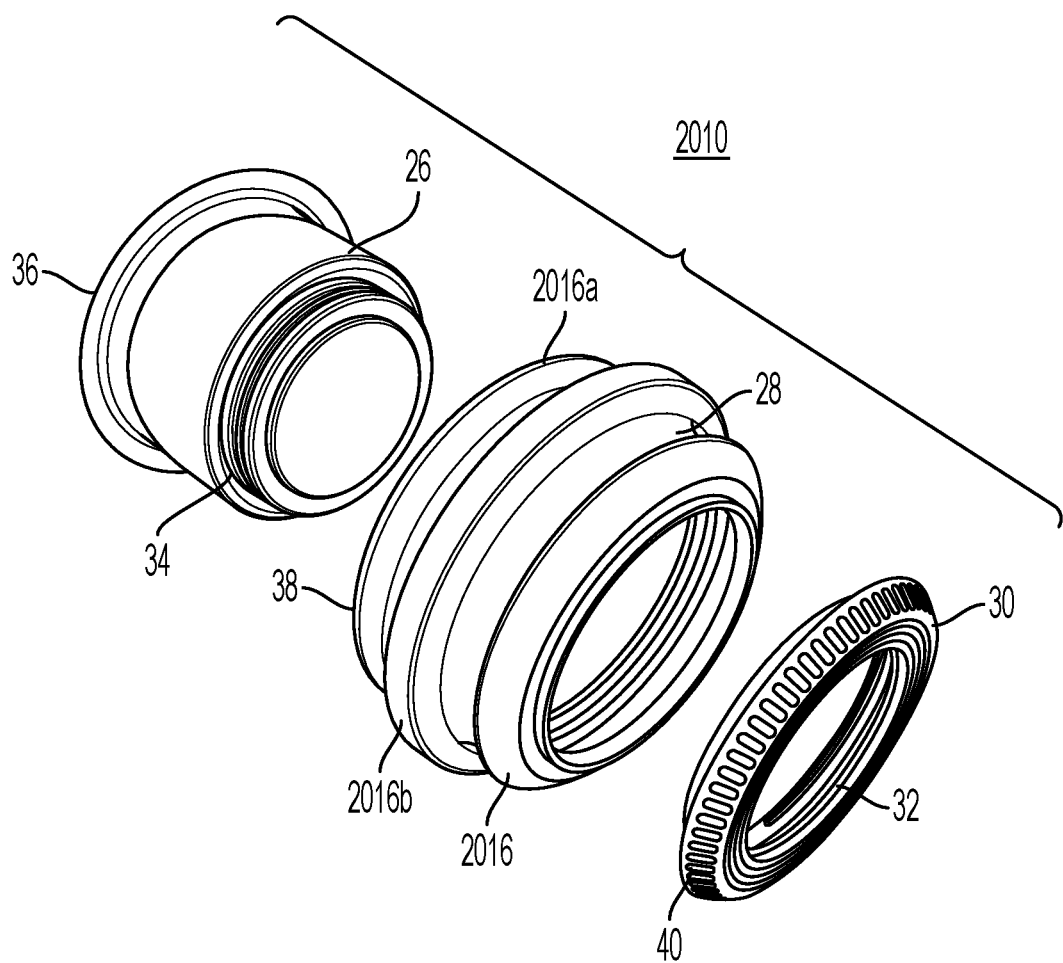
FIG. 20A-C show views of a modular bowl
Figure 20B:
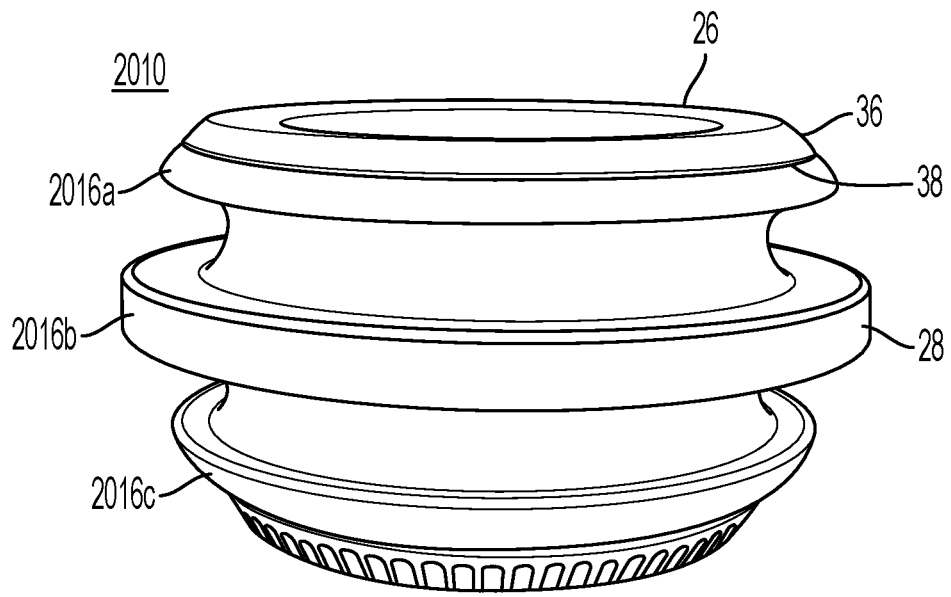
Figure 20C:
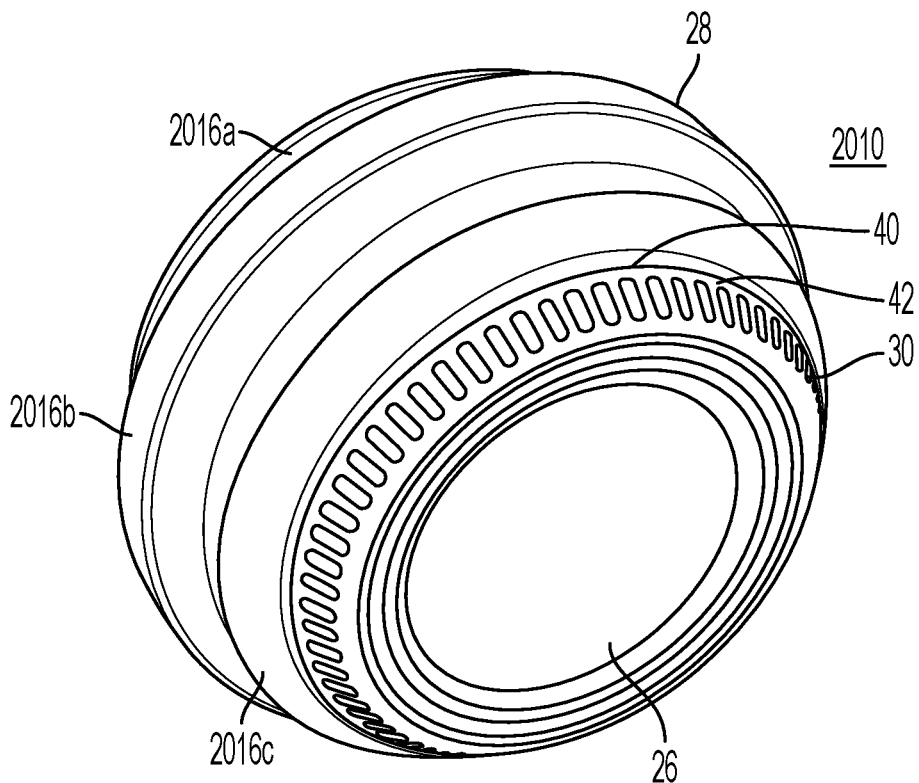

In some embodiments, the inventive subject matter is directed to a bowl consisting of multiple parts and/or materials to allow different material properties to be used (where applicable), to allow for customized shape configurations, or to otherwise enhance the functionality and performance characteristics of the bowl. FIGS. 20A-C show an example of a modular bowl 2010 having multiple parts and materials. FIGS. 20A-C. FIG. 20A is an assembly view, FIG. 20B is an elevational view, and FIG. 20C is a bottom perspective view.

The bowl 2010 is assembled from three parts: (1) a basin portion 26 that holds liquids or other contents; a surround portion 28 that includes graspable element 2016a-c; and a base or footing portion 30 that contacts a surface like a floor or countertop. The embodiment of FIG. 20 is similar to that of FIG. 3 but instead of having a cylindrical shape defined by graspable elements 2016a-c, it has a toroidal shape defined by graspable elements. In more detail, FIG. 20 shows a bowl 2010 with a series of three ridge-like, circumferentially extending graspable elements 2016A-C. Side walls 2018A-B define the elements. The sidewalls include a vertical face and horizontal faces, which merge into inner walls 2020A-B. The sidewalls and inner walls define circumferential grooves between the graspable elements. These grooves or recesses can function like recessed cabinet handles. One or multiple recesses enabling fingers to securely grip the bowl from the outside, remaining clean. Multiple deep grooves around the circumference of the bowl are a solution enabling the user to easily grasp a single raised ridge or multiple ridges on the outside of the bowl. The toroidal shape is based on the top and bottom graspable 2016a, 2016c having the matching diameters, which are smaller than the diameter of graspable element 2016b.

Figure 21A:
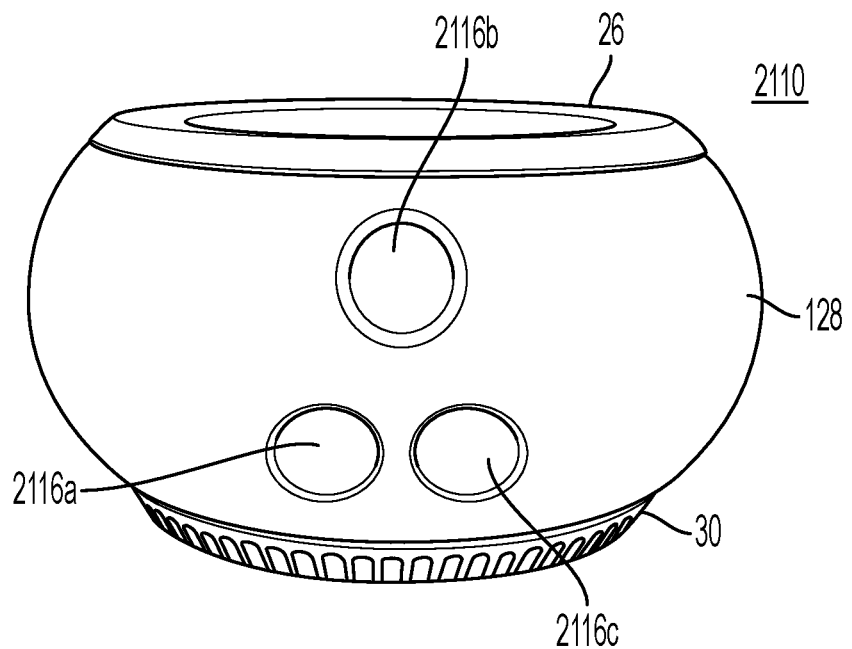
FIG. 21A-B show views of another example of a modular bowl
Figure 21B:
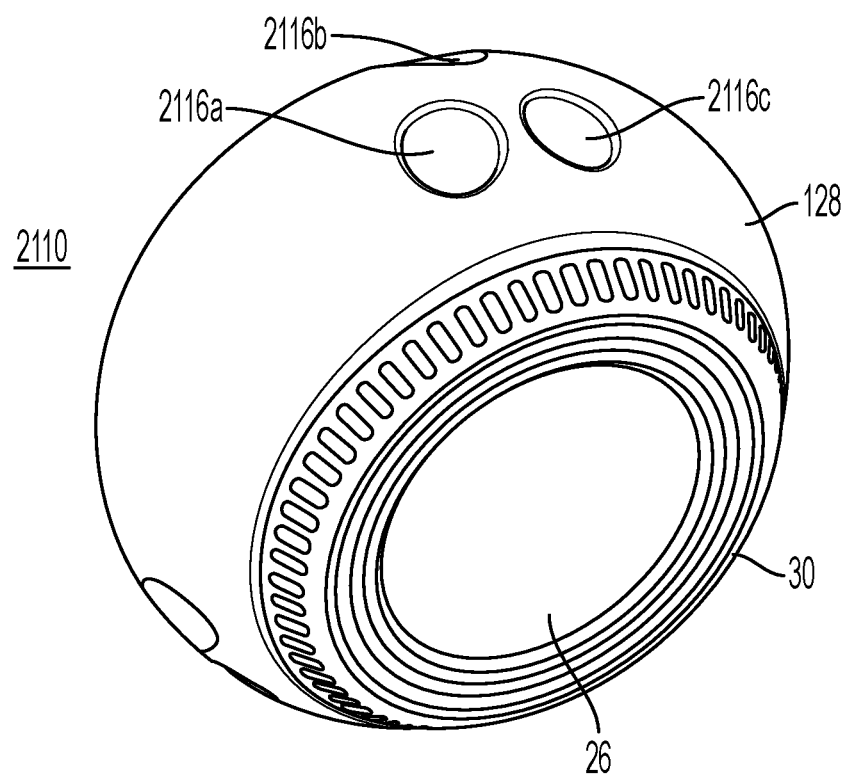

FIGS. 21A-B show views of another example of a modular bowl. FIG. 21A is an elevational view, and FIG. 21B is a bottom perspective view. This bowl is a modularized version of the bowls like those of FIGS. 1 and 16. It has a basin portion 26; a surround portion 128 with graspable elements 2116a-c, and footing portion 30. The basin portion and footing portion can be the same as those used in the embodiment of FIG. 20. Accordingly, it can be appreciated that a modular construction allows for a wide range of different bowl profiles and configurations using common parts. In these examples, the surround portion can be varied to have a shape profile and surface configurations along the lines of most any of the embodiments disclosed herein while using the common parts. Modularity also allows for a kit of parts where users can interchange parts and create custom bowls. Accordingly, the inventive subject matter contemplates endless profiles and configurations using modularity, including with respect to the following features and attributes.

Bowl Core/Food/Liquid Surface

Use of singular materials in a bowl have limitations. For example, rigid nonporous materials (including but not limited to metal, glass, plastic, and ceramic) are ideally suited for the eating, drinking, food storage or preparation surface of a vessel containing food stuffs and liquids. These rigid materials however are not as well suited to securely gripping and handling a bowl or vessel. The bowl core may have a single wall or double wall construction. A double wall vessel offers the advantage of a vacuum for insulating the bowl's contents. In the embodiments of FIGS. 20-21, the basin portion is a metal like stainless steel or aluminum. The surround portion is a polymer like plastic or rubber. The base portion is the same or a different plastic or rubber. In other embodiments, the different parts may be of other materials contemplated in this disclosure. In yet other embodiments, all the parts may be made of the same material.

In the modular embodiments shown, there are three parts. In other embodiments, there may be more or less than three parts. For example, in various two-part versions the surround and base portions could be combined into a single part that combines with a basin portion; the basin and surround portions could be combined into a single part that combines with a base portion; and the basin and base portion could be combined into a single part that combines with a surround portion. In yet other embodiments a given portion could consist of multiple sub-portions. For instance, a surround portion could be based on multiple parts each with a different set of graspable elements or other features.

Bowl Exterior

Materials offering enhanced texture, and or softer materials that conform to the user's hand or fingers are more ideally suited to securely gripping and handling a bowl or vessel, particularly surround portion 28. Natural and man-made materials may be used. A material's physical properties, the surface texture, hardness and sculpting of the bowl shape can all be optimized to enhance grip for improved secure handling of the bowl or vessel or for preventing slippage on a surface. Opaque or transparent materials may be used, for example, in the surround portion. An open cage structure for the surround portion may be used for the bowl exterior to enhance gripping/handling the bowl, and also allow viewing of the basin portion.

Bowl Base

Non-slip properties are ideal for the foot or base of a bowl 30. A soft material on the exterior of the base of the bowl, which may be combined with surface texture and three-dimensional surface details, can be configured to offer suitable friction to keep a bowl or vessel secure on a wide variety of wet or dry surfaces. For example, this may be accomplished by extending the soft bowl exterior to the ground or by adding another part to serve this purpose, as well as creating a way to mechanically hold the entire bowl together.

A bowl base may be made using a single or multiple materials. As one goal of a base material is to prevent a bowl or vessel from sliding on or damaging the surface upon which it is placed, a soft-touch sensation when setting a bowl or vessel down can improve the user experience. Non-slip or elastomeric materials can be incorporated using a hardness range of from 15-90 Shore A or thereabout such range endpoints and any point within such a range.

Multiple materials may be used when structural properties are needed along with elastomeric qualities. In these cases, rigid metal, composites or (engineering) plastics (e.g., 40-90 Shore D or e.g., 45-150 Rockwell R or thereabout such range endpoints and any point within such ranges) may be combined with softer Shore A materials.

Fine and coarse textures (or a combination of both) may be incorporated into all soft and hard components to improve grip, stability, comfort, pleasure, durability and aesthetics of a bowl or vessel when in-use.

Modular Bowl Assembly

Different parts and materials can be combined together in different ways to form a complete bowl, with parts that are fixed together or removably coupled. Combining different materials can include, but is not limited to;

A. Joining the parts or materials via molding (co-molding) during the manufacturing process. For example, parts could be joined during injection or compression molding processes. The parts may be of the same or dissimilar materials. For instance, a metal basin portions could be placed in a mold, which is injected with polymer that forms a surround portion around the basin portion.

B. The parts or materials may be assembled and bonded (mechanically or chemically). For example, parts could be coupled using known mechanical fastners or inter-engagement systems like detent elements and snap-fits. Chemical bonding agents include adhesives or melt fusion of materials.

C. The parts may be assembled and disassembled by snapping parts together or by securing the parts together with one or more mechanical fasteners such as (but not limited to) latches, snaps, interference/friction fit or "screwed-on" parts A bowl or vessel exterior can be made from a single material or multiple materials. A single softer material can be used for a bowl exterior, bowl exterior and base or bowl exterior and interior. Multiple materials may be incorporated to offer a combination of rigidity for structural stability/strength and materials with elastic properties for flexibility, softness, improved grip, tactile feel, comfort, etc.

Engineering plastics (e.g., 40-90 Shore D or e.g., 45-150 Rockwell R or thereabout such range endpoints and any point within such ranges) may be incorporated into a bowl or vessel structure as needed for strength or rigidity. Elastomeric materials (15-90 shore A or thereabout such range endpoints and any point within such a range) may be used in conjunction with stiffer engineering plastics to offer flexibility, softness, improved grip, tactile feel, comfort, and different colors for added perceived value etc.

Fine and coarse textures (or a combination of both) may be incorporated into all soft and hard components to improve grip, stability, comfort, pleasure, durability and aesthetics of a bowl or vessel when in-use.

Screw or Snap Together Assembly

Joining the parts of the bowl using mechanical fasteners such as (but not limited to) an easy to grip screw-on or snap or compression fit ring base allows rapid assembly, disassembly, and reassembly for ease of cleaning, simplified manufacturing, customization, and repair, among other benefits. This combination of parts can be assembled or disassembled in a few seconds.

Screw threads and mechanical fasteners may be made from a wide variety of materials including plastics using softer materials (e.g., 15-90 Shore A or thereabout such range endpoints and any point within such a range) and harder materials (e.g., 40-90 Shore D or e.g., 45-150 Rockwell R or thereabout such range endpoints and any point within such ranges).

Screw-on Ring and Other Parts

The parts of a bowl can be configured for manual coupling and optionally decoupling. For example, complementary threaded portions on different portions of the bowl may engage using screw threads or other coupling means. In the embodiment shown, a base portion 30 may consist of a screw-on "ring", securing portions of the bowl together. The ring has an inward surface with threaded elements 32 that engage with complementary threaded elements 34 found on outer surface of another portion of the bowl, e.g., the bottom of the basin portion 26. The basin portion is received in the surround portion 28 such that threaded portion 34 extends from the bottom of the surround portion 28 and can engage with the complementary threads 32 of the base portion 30. The upper sections of the base portion and surround portion have opposing surfaces 36, 38 that abuttingly engage, and likewise the lower sections of the surround portion and the top basin portion have opposing abutment surfaces 40, 42. Thereby when the basin portion is threaded onto the base portion all parts abuttingly engage and are locked together.

There are various benefits to such a modular assembly. If the bowl is dropped, a ring is less likely to break in a heavy impact compared to a cap. The ring can flex where a screw-on cap with a contiguous (top or bottom) surface would be more rigid and more likely to crack or break rather than deform and resume its original shape.

Screw threads and mechanical fasteners may be made from softer materials (e.g., 15-90 Shore A or thereabout such range endpoints and any point within such a range) and harder materials (e.g., 40-90 Shore D or e.g., 45-150 Rockwell R or thereabout such range endpoints and any point within such ranges).

Manufacturing Efficiency

A bowl core/vessel and base can be shared across a wide variety of bowl exterior part designs for manufacturing efficiency for a given bowl size. The modular design enables cost efficiencies, design, and manufacturing flexibility.

Methods of Making

As stated above, the bowls and vessels, and parts thereof, according to the inventive subject matter may be manufactured from a variety of materials, including metals, plastics, ceramic, wood, glass, or any combination of multiple materials. Manufacturing may be done using traditional and advanced processes, including stamping, hydroforming, injection molding, casting, laminating (as with bamboo or wood veneers), forging, 3D printing, machining, carving etc.

Persons skilled in the art will recognize that many modifications and variations are possible in the details, materials, and arrangements of the parts and actions which have been described and illustrated to explain the nature of the inventive subject matter, and that such modifications and variations do not depart from the spirit and scope of the teachings and claims contained therein.

All patent and non-patent literature cited herein is hereby incorporated by references in its entirety for all purposes.

As used herein, "and/or" means "and" or "or", as well as "and" and "or." Moreover, any and all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more".

All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed as "a means plus function" claim under US patent law, unless the element is expressly recited using the phrase "means for" or "step for".

The inventor reserves all rights to the subject matter disclosed herein, including the right to claim all that comes within the scope and spirit of the following claims.

The invention claimed is:

1. A modular vessel suited for holding water or foodstuff, the vessel comprising:
    a surround portion and one or more of: (i) a basin portion, and/or a (ii) base portion;
    wherein the vessel has an inner wall surface and an outer wall surface, the inner wall and outer wall surfaces each having a profile shape, the inner wall surface defining a volumetric capacity for the vessel of 60 cubic centimeters to 30 liters for holding water or foodstuff, the inner wall surface having a top height, the perimeter of the inner wall surface at the top height defining a horizontal area of 45 cm$^2$ to 4500 cm$^2$; and
    wherein the outer wall surface comprises graspable elements that comprise multiple deep grooves horizontally oriented around the circumference of the bowl, and wherein the graspable elements include opposing sides that can be pinched by fingers.

2. The vessel of claim 1 wherein the portions are removably assembled.

3. The vessel of claim 1 wherein the surround portion receives and surrounds the basin portion.

4. The vessel of claim 3 wherein the surround portion is assembled with a basin portion and a base portion, a lower section of the basin portion inserting through the surround portion and coupling to the base portion.

5. The vessel of claim 4 wherein the surround portion and basin portion comprise different materials.

6. The vessel of claim 3 wherein the basin portion comprises metal, and the surround portion comprises rubber or plastic.

7. The vessel of claim 1 wherein the outer wall surface of the surround portion includes one or more graspable elements, each graspable element being configured to receive one or more fingers of a user so that the user can grasp the graspable element and lift the bowl from a surface when the bowl is upright on the surface, without having to place the fingers within the volumetric space or under the vessel.

8. The vessel of claim 1 wherein the vessel has a low center of gravity.

9. The vessel of claim 1 wherein the height of the vessel is between 30 mm to 300 mm.

10. The vessel of claim 7 wherein the graspable elements include opposing sides that are configured to be pinched by a pair of fingers on the same hand.

11. The vessel of claim 1 wherein the outer wall surface profile shape is different from the basin portion's inner wall surface profile shape.

12. A method of making a modular vessel suited for holding water or foodstuff, the vessel comprising the steps of:
    providing a surround portion and one or more of: (i) a basin portion, and/or a (ii) base portion;
    assembling the provided portions to provide an inner wall surface and an outer wall surface, the inner wall and outer wall surfaces each having a profile shape, the inner surface defining a volumetric capacity for the vessel of 60 cubic centimeters to 30 liters for holding water or foodstuff, the inner wall surface having a top height, the perimeter of the inner wall surface at the top height of the vessel being 45 cm$^2$ to 4500 cm$^2$; and
    wherein the outer wall surface comprises graspable elements that comprise multiple deep grooves horizontally oriented around the circumference of the bowl, and wherein the graspable elements include opposing sides that can be pinched by fingers.

13. A bowl vessel comprising:
    a basin portion, a surround portion, and a base portion, wherein
        the basin portion may be removable assembled with the surround portion and base portion; and wherein
            the basin portion comprises a threaded portion and a top abutment surface, and wherein the base portion comprises a complementary threaded receiving portion to receive the threaded portion, and wherein
    the surround portion receive the basin portion so that the top abutment surface rests on an opposing surface located on the surround portion; and
    the surround portion comprises on its exterior at least one set of graspable elements; said graspable elements consisting of
        a continuous, horizontally oriented projection and two deep-set grooves; wherein one groove is located above and one groove is located below the horizontally oriented projection; wherein
            the two deep-set grooves are configured to allow a user to pinch opposing side of the horizontally oriented projection to lift the bowl vessel from a surface.

* * * * *